(12) United States Patent
Balamurugan et al.

(10) Patent No.: US 11,909,713 B2
(45) Date of Patent: *Feb. 20, 2024

(54) ADDRESS TRANSLATION FOR EXTERNAL NETWORK APPLIANCE

(71) Applicant: Cisco Technology, Inc., San Jose, CA (US)

(72) Inventors: Vivek Balamurugan, San Jose, CA (US); Chandra Nagarajan, Fremont, CA (US); Divjyot Sethi, Fremont, CA (US); Chaitanya Velpula, San Jose, CA (US); Manvesh Vyas, Santa Clara, CA (US); Ramana Rao Kompella, Cupertino, CA (US); Pradhap Muthuraman, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/306,816

(22) Filed: May 3, 2021

(65) Prior Publication Data
US 2021/0258281 A1   Aug. 19, 2021

Related U.S. Application Data

(63) Continuation of application No. 16/171,771, filed on Oct. 26, 2018, now Pat. No. 11,019,027.
(Continued)

(51) Int. Cl.
*H04L 29/12* (2006.01)
*H04L 12/715* (2013.01)
(Continued)

(52) U.S. Cl.
CPC ........ *H04L 61/256* (2013.01); *G06F 9/45558* (2013.01); *H04L 12/4641* (2013.01);
(Continued)

(58) Field of Classification Search
CPC ... H04L 61/256; H04L 45/64; H04L 41/0893; H04L 45/7457; H04L 61/2514;
(Continued)

(56) References Cited

U.S. PATENT DOCUMENTS

| 5,204,829 | A | 4/1993 | Lyu et al. |
| 6,763,380 | B1 | 7/2004 | Mayton et al. |

(Continued)

FOREIGN PATENT DOCUMENTS

| CN | 105471830 | 4/2016 |
| CN | 105721193 | 6/2016 |

(Continued)

OTHER PUBLICATIONS

"Cisco NAT Network Address Translation Practical"—CODEC Networks, Aug. 28, 2017 https://www.codecnetworks.com/blog/cisco-nat-network-address-translation-practical/ (Year: 2017).*
(Continued)

*Primary Examiner* — Randy A Scott
(74) *Attorney, Agent, or Firm* — Polsinelli P.C.

(57) ABSTRACT

Systems, methods, and computer-readable media relate to providing a network management service. A system is configured to request first network information from a first component of a network using a public IP address for the first component, wherein the first network information includes private IP addresses for a second component in the network and translate, based on a mapping information for a private IP address space to a public IP address space, the private IP address for a second component to a public IP address for the second component. The system is further configured to request second network information from the second component using the public IP address and provide a network management service for the network based on the second network information.

20 Claims, 16 Drawing Sheets

Related U.S. Application Data

(60) Provisional application No. 62/690,727, filed on Jun. 27, 2018.

(51) Int. Cl.

| | | |
|---|---|---|
| *H04L 12/743* | (2013.01) | |
| *H04L 12/24* | (2006.01) | |
| *H04L 29/06* | (2006.01) | |
| *G06F 9/455* | (2018.01) | |
| *H04L 12/46* | (2006.01) | |
| *H04L 61/256* | (2022.01) | |
| *H04L 45/64* | (2022.01) | |
| *H04L 41/0893* | (2022.01) | |
| *H04L 69/22* | (2022.01) | |
| *H04L 61/2514* | (2022.01) | |
| *H04L 45/745* | (2022.01) | |

(52) U.S. Cl.
CPC .......... *H04L 41/0893* (2013.01); *H04L 45/64* (2013.01); *H04L 45/74591* (2022.05); *H04L 61/2514* (2013.01); *H04L 69/22* (2013.01); *G06F 2009/45595* (2013.01); *H04L 12/4633* (2013.01)

(58) Field of Classification Search
CPC . H04L 12/4641; H04L 12/4633; H04L 69/22; G06F 9/45558
See application file for complete search history.

(56) References Cited

U.S. PATENT DOCUMENTS

| | | | |
|---|---|---|---|
| 7,003,562 | B2 | 2/2006 | Mayer |
| 7,089,369 | B2 | 8/2006 | Emberling |
| 7,127,686 | B2 | 10/2006 | Dreschler et al. |
| 7,360,064 | B1 | 4/2008 | Steiss et al. |
| 7,453,886 | B1 | 11/2008 | Allan |
| 7,505,463 | B2 | 3/2009 | Schuba et al. |
| 7,548,967 | B2 | 6/2009 | Amyot et al. |
| 7,552,201 | B2 | 6/2009 | Areddu et al. |
| 7,609,647 | B2 | 10/2009 | Turk et al. |
| 7,619,989 | B2 | 11/2009 | Guingo et al. |
| 7,698,561 | B2 | 4/2010 | Nagendra et al. |
| 7,743,274 | B2 | 6/2010 | Langford et al. |
| 7,765,093 | B2 | 7/2010 | Li et al. |
| 8,010,952 | B2 | 8/2011 | Datla et al. |
| 8,073,935 | B2 | 12/2011 | Viswanath |
| 8,103,480 | B2 | 1/2012 | Korn et al. |
| 8,190,719 | B2 | 5/2012 | Furukawa |
| 8,209,738 | B2 | 6/2012 | Nicol et al. |
| 8,261,339 | B2 | 9/2012 | Aldridge et al. |
| 8,312,261 | B2 | 11/2012 | Rao et al. |
| 8,375,117 | B2 | 2/2013 | Venable, Sr. |
| 8,441,941 | B2 | 5/2013 | McDade et al. |
| 8,479,267 | B2 | 7/2013 | Donley et al. |
| 8,484,693 | B2 | 7/2013 | Cox et al. |
| 8,494,977 | B1 | 7/2013 | Yehuda et al. |
| 8,554,883 | B2 | 10/2013 | Sankaran |
| 8,589,934 | B2 | 11/2013 | Makljenovic et al. |
| 8,621,284 | B2 | 12/2013 | Kato |
| 8,627,328 | B2 | 1/2014 | Mousseau et al. |
| 8,693,344 | B1 | 4/2014 | Adams et al. |
| 8,693,374 | B1 | 4/2014 | Murphy et al. |
| 8,761,036 | B2 | 6/2014 | Fulton et al. |
| 8,782,182 | B2 | 7/2014 | Chaturvedi et al. |
| 8,824,482 | B2 | 9/2014 | Kajekar et al. |
| 8,910,143 | B2 | 12/2014 | Cohen et al. |
| 8,914,843 | B2 | 12/2014 | Bryan et al. |
| 8,924,798 | B2 | 12/2014 | Jerde et al. |
| 9,019,840 | B2 | 4/2015 | Salam et al. |
| 9,038,151 | B1 | 5/2015 | Chua et al. |
| 9,055,000 | B1 | 6/2015 | Ghosh et al. |
| 9,106,555 | B2 | 8/2015 | Agarwal et al. |
| 9,137,096 | B1 | 9/2015 | Yehuda et al. |
| 9,225,601 | B2 | 12/2015 | Khurshid et al. |
| 9,246,818 | B2 | 1/2016 | Deshpande et al. |
| 9,264,922 | B2 | 2/2016 | Gillot et al. |
| 9,276,877 | B1 | 3/2016 | Chua et al. |
| 9,319,300 | B2 | 4/2016 | Huynh Van et al. |
| 9,344,348 | B2 | 5/2016 | Ivanov et al. |
| 9,369,302 | B1* | 6/2016 | Dickinson .......... H04L 61/2503 |
| 9,369,434 | B2 | 6/2016 | Kim et al. |
| 9,389,993 | B1 | 7/2016 | Okmyanskiy et al. |
| 9,405,553 | B2 | 8/2016 | Branson et al. |
| 9,444,842 | B2 | 9/2016 | Porras et al. |
| 9,497,207 | B2 | 11/2016 | Dhawan et al. |
| 9,497,215 | B2 | 11/2016 | Vasseur et al. |
| 9,544,224 | B2 | 1/2017 | Chu et al. |
| 9,548,965 | B2 | 1/2017 | Wang et al. |
| 9,553,845 | B1 | 1/2017 | Talmor et al. |
| 9,571,502 | B2 | 2/2017 | Basso et al. |
| 9,571,523 | B2 | 2/2017 | Porras et al. |
| 9,594,640 | B1 | 3/2017 | Chheda |
| 9,596,141 | B2 | 3/2017 | McDowall |
| 9,641,249 | B2 | 5/2017 | Kaneriya et al. |
| 9,654,300 | B2 | 5/2017 | Pani |
| 9,654,361 | B2 | 5/2017 | Vasseur et al. |
| 9,654,409 | B2 | 5/2017 | Yadav et al. |
| 9,660,886 | B1 | 5/2017 | Ye et al. |
| 9,660,897 | B1 | 5/2017 | Gredler |
| 9,667,645 | B1 | 5/2017 | Belani et al. |
| 9,680,875 | B2 | 6/2017 | Knjazihhin et al. |
| 9,686,180 | B2 | 6/2017 | Chu et al. |
| 9,686,296 | B1 | 6/2017 | Murchison et al. |
| 9,690,644 | B2 | 6/2017 | Anderson et al. |
| 9,781,004 | B2 | 10/2017 | Danait et al. |
| 9,787,559 | B1 | 10/2017 | Schroeder |
| 9,998,247 | B1 | 6/2018 | Choudhury et al. |
| 10,057,267 | B1* | 8/2018 | Miller .................. H04L 63/102 |
| 10,084,795 | B2 | 9/2018 | Akireddy et al. |
| 10,084,833 | B2 | 9/2018 | McDonnell et al. |
| 10,084,895 | B2 | 9/2018 | Kasat et al. |
| 10,218,597 | B1 | 2/2019 | Miller et al. |
| 10,237,235 | B1 | 3/2019 | Dickinson |
| 10,237,355 | B2 | 3/2019 | Rao |
| 2002/0143855 | A1 | 10/2002 | Traversat et al. |
| 2002/0178246 | A1 | 11/2002 | Mayer |
| 2003/0229693 | A1 | 12/2003 | Mahlik et al. |
| 2004/0073647 | A1 | 4/2004 | Gentile et al. |
| 2004/0168100 | A1 | 8/2004 | Thottan et al. |
| 2005/0108389 | A1 | 5/2005 | Kempin et al. |
| 2007/0011629 | A1 | 1/2007 | Shacham et al. |
| 2007/0124437 | A1 | 5/2007 | Chervets |
| 2007/0214244 | A1 | 9/2007 | Hitokoto et al. |
| 2008/0031147 | A1 | 2/2008 | Fieremans et al. |
| 2008/0117827 | A1 | 5/2008 | Matsumoto et al. |
| 2008/0133731 | A1 | 6/2008 | Bradley et al. |
| 2008/0172716 | A1 | 7/2008 | Talpade et al. |
| 2009/0240758 | A1 | 9/2009 | Pasko et al. |
| 2009/0249284 | A1 | 10/2009 | Antosz et al. |
| 2010/0191612 | A1 | 7/2010 | Raleigh |
| 2010/0198909 | A1 | 8/2010 | Kosbab et al. |
| 2011/0093612 | A1 | 4/2011 | Murakami |
| 2011/0295983 | A1 | 12/2011 | Medved et al. |
| 2012/0054163 | A1 | 3/2012 | Liu et al. |
| 2012/0198073 | A1 | 8/2012 | Srikanth et al. |
| 2012/0297061 | A1 | 11/2012 | Pedigo et al. |
| 2013/0097660 | A1 | 4/2013 | Das et al. |
| 2013/0191516 | A1 | 7/2013 | Sears |
| 2014/0019597 | A1 | 1/2014 | Nath et al. |
| 2014/0140344 | A1* | 5/2014 | Krishnan ............ H04L 61/2517 370/392 |
| 2014/0177638 | A1 | 6/2014 | Bragg et al. |
| 2014/0222996 | A1 | 8/2014 | Vasseur et al. |
| 2014/0280884 | A1 | 9/2014 | Searle et al. |
| 2014/0304831 | A1 | 10/2014 | Hidlreth et al. |
| 2014/0307556 | A1 | 10/2014 | Zhang |
| 2014/0321277 | A1 | 10/2014 | Lynn, Jr. et al. |
| 2014/0379915 | A1 | 12/2014 | Yang et al. |
| 2015/0019756 | A1 | 1/2015 | Masuda |
| 2015/0113143 | A1 | 4/2015 | Stuart et al. |
| 2015/0124826 | A1 | 5/2015 | Edsall et al. |
| 2015/0186206 | A1 | 7/2015 | Bhattacharya et al. |

(56) References Cited

U.S. PATENT DOCUMENTS

| | | |
|---|---|---|
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0149751 A1 | 5/2016 | Pani et al. |
| 2016/0164748 A1 | 6/2016 | Kim |
| 2016/0224277 A1 | 8/2016 | Batra et al. |
| 2016/0241436 A1 | 8/2016 | Fourie et al. |
| 2016/0254964 A1 | 9/2016 | Benc |
| 2016/0267384 A1 | 9/2016 | Salam et al. |
| 2016/0323319 A1 | 11/2016 | Gourlay et al. |
| 2016/0330075 A1 | 11/2016 | Tiwari et al. |
| 2016/0330076 A1 | 11/2016 | Tiwari et al. |
| 2016/0352566 A1 | 12/2016 | Mekkattuparamnban et al. |
| 2016/0380892 A1 | 12/2016 | Mahadevan et al. |
| 2017/0026292 A1 | 1/2017 | Smith et al. |
| 2017/0031800 A1 | 2/2017 | Shani et al. |
| 2017/0031970 A1 | 2/2017 | Burk |
| 2017/0048110 A1 | 2/2017 | Wu et al. |
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111259 A1 | 4/2017 | Wen et al. |
| 2017/0118167 A1 | 4/2017 | Subramanya et al. |
| 2017/0126740 A1 | 5/2017 | Bejarano Ardila et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0222873 A1 | 8/2017 | Lee et al. |
| 2017/0353355 A1 | 12/2017 | Danait et al. |
| 2018/0069754 A1 | 3/2018 | Dasu et al. |
| 2018/0069782 A1* | 3/2018 | Wosik ................ H04L 61/2532 |
| 2018/0167294 A1 | 6/2018 | Gupta et al. |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

"Network Address Translation (NAT) for Firepower Threat Defense"—Firepower Management Center Configuration Guide, Version 6.2.1, Cisco, May 16, 2017 https://www.cisco.com/c/en/us/td/docs/security/firepower/621/configuration/guide/fpmc-config-guide-v621/nat_for_firepower_threat_defense.html (Year: 2017).*

Akella, Aditya, et al., "A Highly Available Software Defined Fabric," HotNets-XIII, Oct. 27-28, 2014, Los Angeles, CA, USA, Copyright 2014, ACM, pp. 1-7.

Alsheikh, Mohammad Abu, et al., "Machine Learning in Wireless Sensor Networks: Algorithms, Strategies, and Application," Mar. 19, 2015, pp. 1-23.

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco Systems, Inc., "Cisco Application Centric Infrastructure 9ACI Endpoint Groups (EPG) Usage and Design," White Paper, May 2014, pp. 1-14.

Cisco Systems, Inc., "The Cisco Application Policy Infrastructure Controller Introduction: What is the Cisco Application Policy Infrastructure Controller?" Jul. 31, 2014, 19 pages.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Wonkyu, et al., "LPM: Layered Policy Management for Software-Defined Networks," Mar. 8, 2016, pp. 1-8.

Han, Yoonseon, et al., "An Intent-based Network Virtualization Platform for SDN," 2016 I FIP, pp. 1-6.

Jain, Praveen, et al., "In-Line Distributed and Stateful Security Policies for Applications in a Network Environment," Cisco Systems, Inc., Aug. 16, 2016, 13 pages.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Lindem, A., et al., "Network Device YANG Organizational Model draft-rtgyangdt-rtgwg-device-model-01," Network Working Group, Internet-draft, Sep. 21, 2015, pp. 1-33.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

(56) References Cited

OTHER PUBLICATIONS

Maldonado-Lopez, Ferney, et al., "Detection and prevention of firewall—rule conflicts on software-defined networking," 2015 7$^{th}$ International Workshop on Reliable Networks Design and Modeling (RNDM), IEEE, Oct. 5, 2015, pp. 259-265.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, pp. 1-10.

Moon, Daekyeong, et al., "Bridging the Software/Hardware Forwarding Divide," Berkeley.edu, Dec. 18, 2010, pp. 1-15.

Panda, Aurojit, et al., "SCL: Simplifying Distributed SDN Control Planes," people.eecs.berkeley.edu, Mar. 2017, pp. 1-17.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

Vega, Andres, et al., "Troubleshooting Cisco Application Centric Infrastructure: Analytical problem solving applied to the Policy Driven Data Center," Feb. 15, 2016, 84 pages.

Xia, Wenfeng, et al., "A Survey on Software-Defined Networking," IEEE Communications Surveys and Tutorials, Mar. 16, 2015, pp. 27-51.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

Zhou, Shijie, et al., "High-Performance Packet Classification on GPU," 2014 IEEE, pp. 1-6.

"Large Scale Network Address Translation," How to Configure Large Scale NAT (LSN) on A10 Thunder/VThurnder CGN Devices, 59 pages, 2017.

\* cited by examiner

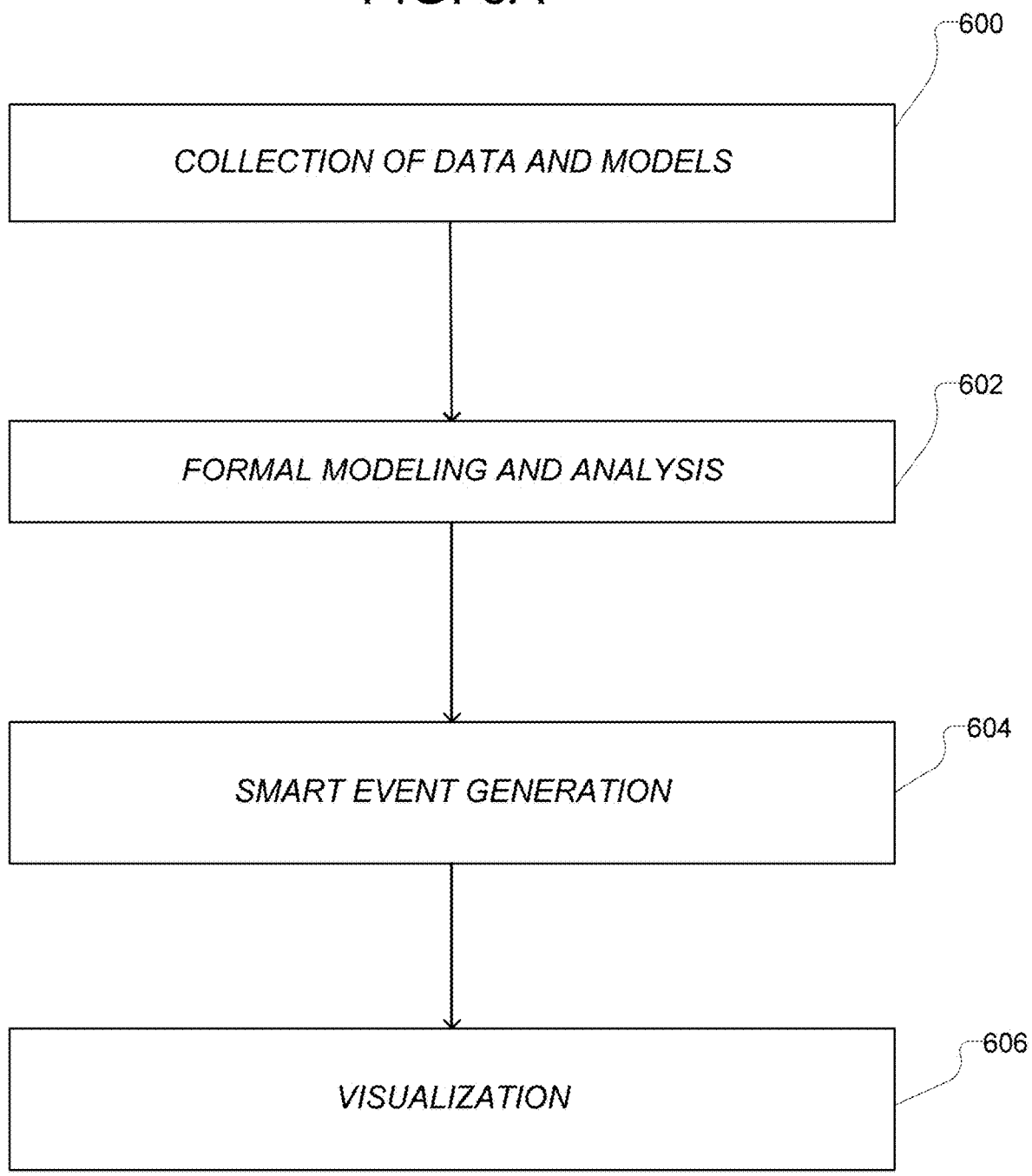

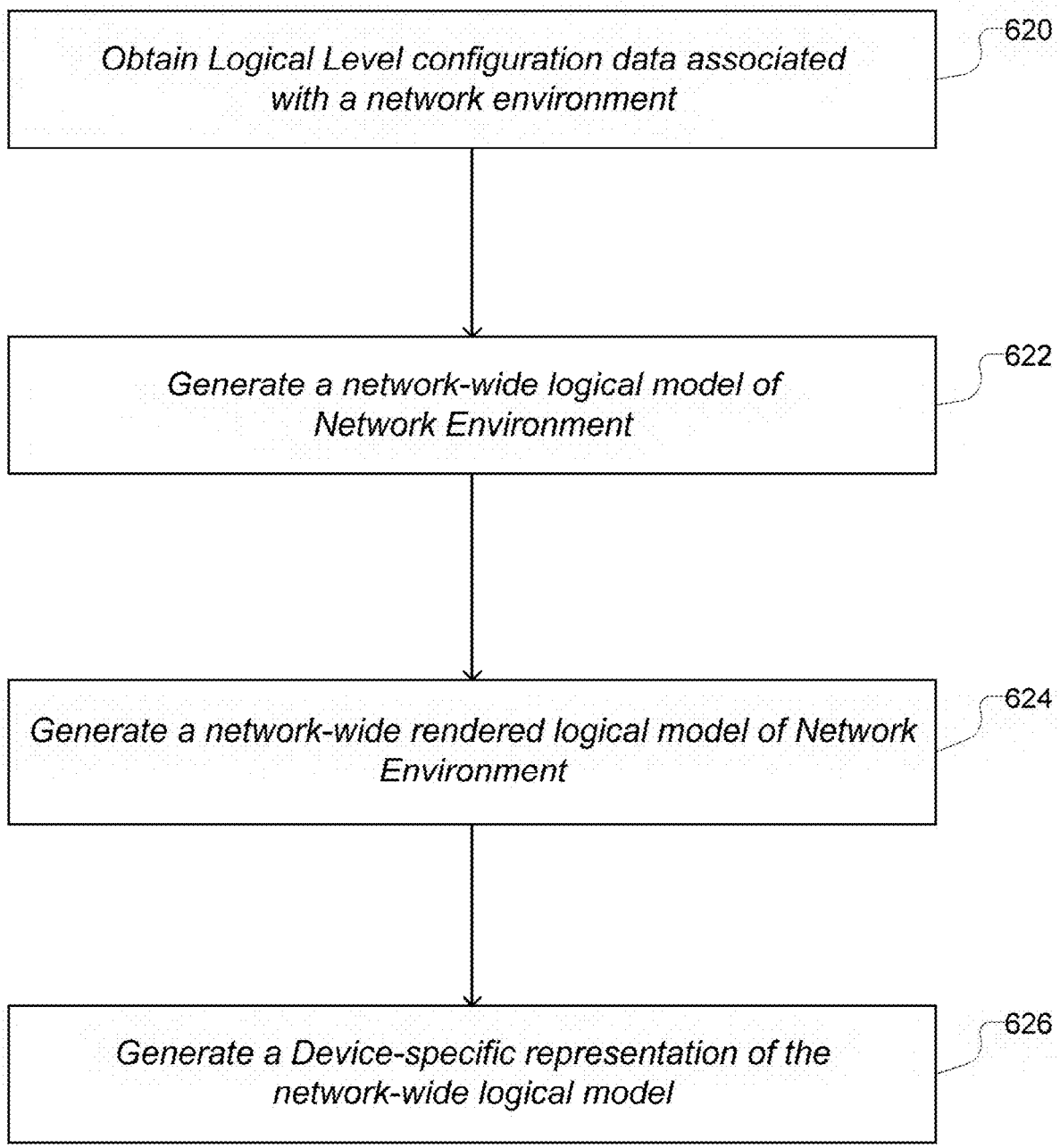

ADDRESS TRANSLATION FOR EXTERNAL NETWORK APPLIANCE

CROSS REFERENCE TO RELATED APPLICATIONS

This application is a continuation of U.S. Non-Provisional patent application Ser. No. 16/171,771, filed Oct. 26, 2018, which claims the benefit of U.S. Provisional Patent Application No. 62/690,727, filed Jun. 27, 2018, the full disclosures of which are incorporated herein by reference in their entireties.

TECHNICAL FIELD

The present technology pertains to network technologies, and more specifically to the configuration and management of network resources.

BACKGROUND

Various network management tools are available to provide services for networks. The services may include, for example, managing, protecting, monitoring, or configuring a network and/or resources on the network (e.g., applications, servers, storage, etc.). The networks may also be of various types (e.g., a campus network, a data center network, an enterprise network, a wireless network, a cellular network, an intranet, a network fabric, branch networks, or a combination of networks) and serve various different purposes. These network management tools may be hosted on one or more machines in the network and provide an interface for the network to external machines.

An increasingly popular configuration is cloud based networking or the cloud management of network resources. In cloud based networking, the network management tools that provide services for the network (or the network resources) are hosted externally from the network. Often, the network management tools are hosted from a centralized third-party provider using wide area networking (WAN) or internet-based access technologies. Cloud management of network resources has several advantages. However, there are technical problems that are addressed by various aspects of the subject technology.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6A illustrates a flowchart for an example network assurance method, in accordance with various aspects of the subject technology;

FIG. 6B illustrates an example method for generating a device specific logical model, in accordance with various aspects of the subject technology;

DESCRIPTION OF EXAMPLE EMBODIMENTS

Figure 1:
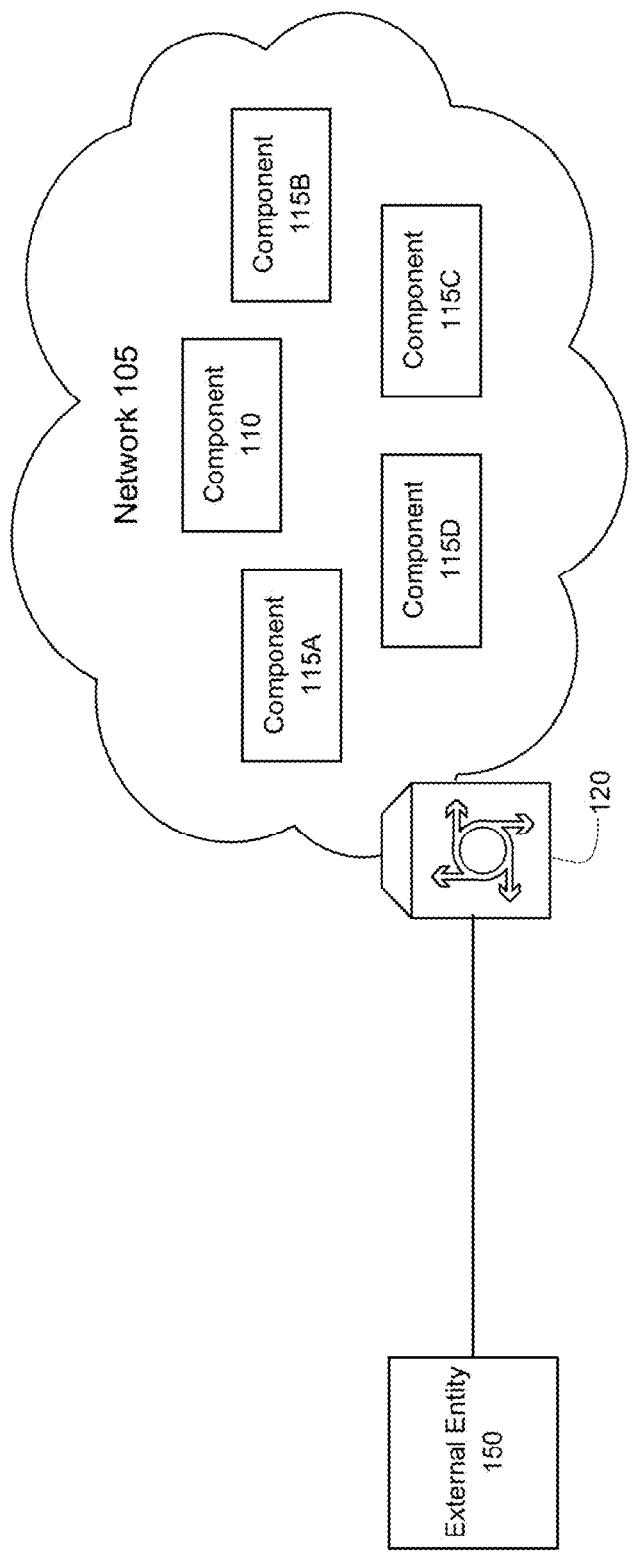
FIG. 1 is a conceptual block diagram illustrating an example network environment, in accordance with various embodiments of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Systems, methods, and computer-readable media relate to providing a network management service. A system is configured to request first network information from a first component of a network using a public IP address for the first component, wherein the first network information includes private IP addresses for a second component in the network and translate, based on a mapping information for a private IP address space to a public IP address space, the private IP address for a second component to a public IP address for the second component. The system is further configured to request second network information from the second component using the public IP address and provide a network management service for the network based on the second network information.

EXAMPLE EMBODIMENTS

Cloud management of a network or of network resources often involves one or more network management tools hosted on a network controller or network appliance located external to a network. The network tool is configured to communicate with resources or components within the network in order to provide services for the network. In other words, in order to provide management, protection, configuration, monitoring, or other services to the network, the network tool must be able to access and interact with one or more components or services in the network. For example, the network tool may communicate with a component of the network using the component's internet protocol (IP) address.

Some networks employ network address translation (NAT) to map one IP address space to another IP address space. A network may use network address translation for a variety of reasons. For example, NAT techniques may be used to avoid readdressing network components when a network is moved, to conserve IP address space, or hiding a private IP address space. The network may utilize one or more NAT servers to implement network address translation functions. A NAT server is a routing device configured to use the mapping of one IP address space to another IP address space to modify network address information in the IP header of data packets that come into or flow out of the network.

Unfortunately, NAT functions obscure the private internet protocol (IP) addresses of the network resources and components within the network from entities outside of the network, such as network management tools hosted on external network controllers or appliances. Although some resources (e.g., a controller within the network) may have a known public IP address, other resources in the network may not. Accordingly, the resources without known public IP addresses may be unreachable by the external controller or appliance. This may hinder many of the functions, features, and services provided by the external controller or appliance.

Aspects of the subject technology provide a technological solution to the above by providing a means for an entity (e.g., a network management tool, a virtual machine, a host machine, a controller or appliance, etc.) external to the network to discover unknown public IP addresses of resources or components in the network.

FIG. 1 is a conceptual block diagram illustrating an example network environment 100, in accordance with various embodiments of the subject technology. The network environment includes a network 105, various components 110 and 115A-D of the network 105, a network address translation (NAT) server 120, and an external entity. The network 105 and the network environment 100 as a whole may be in various different configurations and/or serve various different purposes. For example, the network environment 100 and/or the network 105 may include, any one or more of a cellular network, a satellite network, a personal area network (PAN), a local area network (LAN), a wide area network (WAN), a broadband network (BBN), the Internet, a campus network, a data center network, an enterprise network, a wireless network, a an intranet, a network fabric, a data center network branch networks, and the like. In many cases, communications in the network environment 100 may occur over a combination of different networks. The network environment 100 may be implemented using any number of communications links associated with one or more service providers, including one or more wired communication links, one or more wireless communication links, or any combination thereof. Additionally, the network environment 100 can be configured to support the transmission of data formatted using any number of protocols.

Depending on the type and function of the network 105 shown in FIG. 1, the network 105 may include a number of components such as access points, switches, routers, firewalls, endpoint devices, servers, user devices, virtual machines, applications, etc. The network 105 may also include a NAT server 120 and/or connect to an internet service provider (ISP) gateway, which further connects other external entities (e.g., external entity 150) to components of the network 105. The external entity 150 may include various computing entities such as endpoint devices, servers, virtual machines, user devices, etc. In the case of a cloud managed network or cloud enabled network management tools, the external entity 150 may be in the form of a network appliance, network controller, or other entity that provides network management services for the network 105.

The components and topological configuration of the network 105 and the network environment 100 as a whole are shown in FIG. 1 for illustrative purposes and other types of network devices and configurations may also be applicable.

The NAT server 120 intercepts communications between the external entity and the components within the network 105 and routes them to the appropriate destination using NAT configuration information that maps one IP address space to another IP address space. For example, an external entity 150 generally communicates with components within the network 105 using a public IP address for the component or an IP address that is known and used externally to the network 105. The NAT server 120 intercepts the communications addressed using the public IP address for the component, translates the public IP address of the component to a corresponding private IP address used within the network 105, and routes the communication to the appropriate destination using the private IP address.

One or more components in the network 105, such as component 110, may be configured to have a public IP address that is known externally to the network 105. For example, component 110 may be an application server or a network controller that is designed to be reachable by external entities. Accordingly, the public IP address of the component 110 may be published or otherwise made known to the external entity 150 and, as a result, the external entity 150 may be able to communicate with the component 110 using the public IP address for the component 110.

However, in some cases, the external entity 150 may also wish to communicate with other components 115A-D in the network that do not have public IP addresses known to the external entity. In one example embodiment that will be discussed in further detail throughout, the external entity 150 may be a network assurance appliance configured to provide assurance services for a remote network. In providing optimal levels of assurance services, the external entity 150 may need to communicate with other components (e.g., leaf nodes, spine nodes, routers, switches, etc.) in the network 105. The external entity 150 will be unable to communicate with those components, however, because the public IP addresses for those components are not known to the external entity 150. In fact, the external entity 150 may not even be aware of the existence of the other components 115A-115D.

Aspects of the subject technology address this technical problem by providing a means for an entity (e.g., a network management tool, a virtual machine, a host machine, a controller or appliance, etc.) external to the network to discover unknown public IP addresses of resources or components in the network. In some embodiments, the external entity 150 may be configured to request additional IP addresses for the other components 115A-D from the known component 110 (e.g., the component in the network associated with the known public IP address). However, the IP addresses provided by the known component 110 (e.g., the network controller) are private IP addresses for the other components of the network 115A-D. Because the known component 110 and the other components 115A-D are all within the same network 105, communication within the network 105 is achieved via the private IP addresses of the components. The private IP addresses for the other components 115A-D cannot be used by the external entity 150 to communicate with the other components 115A-D because they will not be recognized by the NAT server 120 or routed to the correct destination. This technological obstacle is addressed by translating the private IP addresses into public IP addresses using a NAT configuration file that maps a component's private IP address to a corresponding public IP address that can be used by the external entity 150 to communicate with the component.

Figure 2:
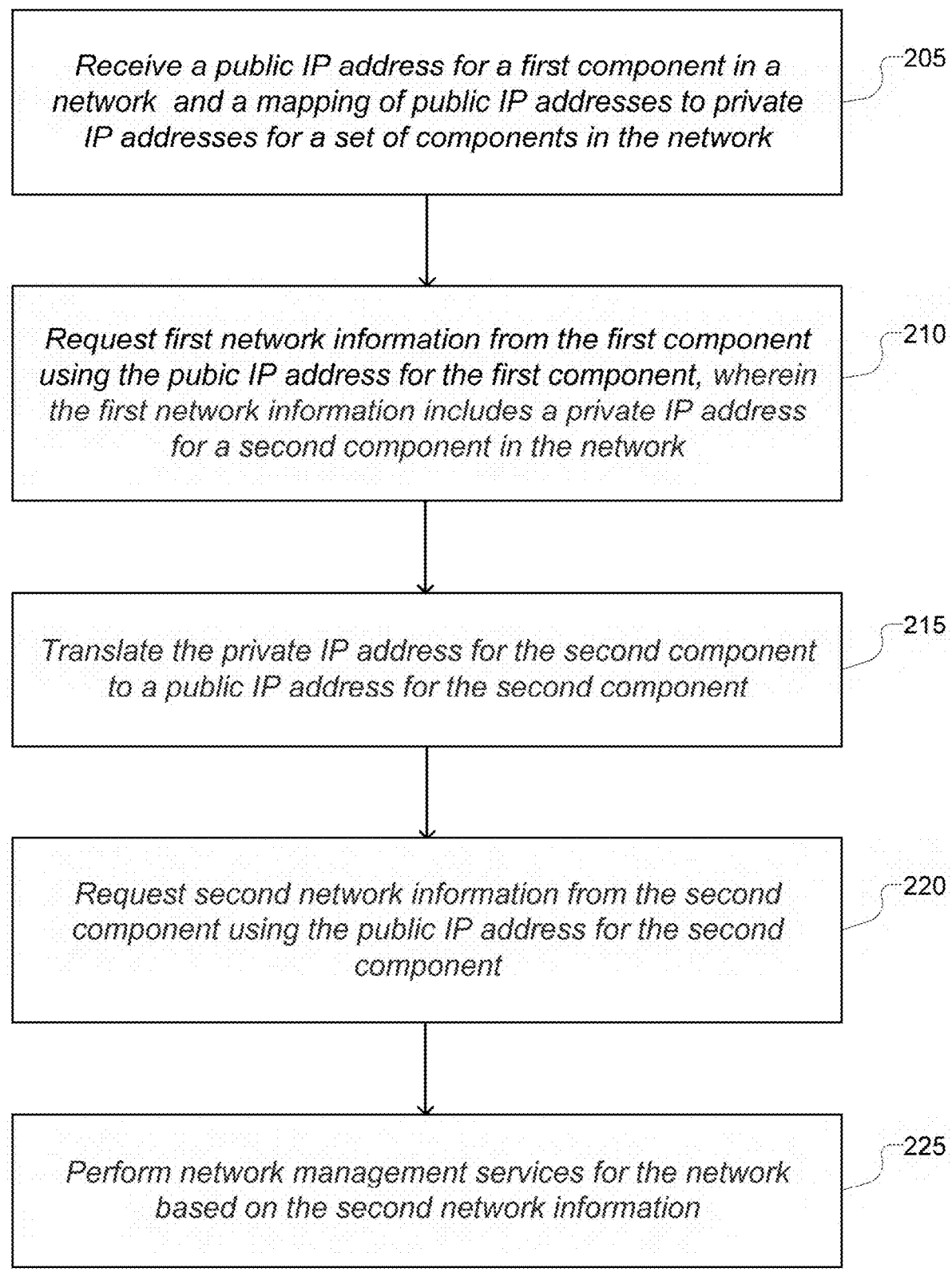
FIG. 2 shows an example process performing network management services for a network, in accordance with various embodiments of the subject technology.

FIG. 2 shows an example process performing network management services for a network, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 200 can be performed by an entity external to the network for which network management services are performed. The entity may be, for example, external entity 150 of FIG. 1 (e.g., a network assurance appliance or other cloud network management tool). For illustrative purposes, the process 200 is described with respect to a first and a second component in the network. However, the process 200 may also apply to networks with any number of network components. Furthermore, although the process 200 discusses performing network management services, communication from the external entity to the network components may be for various other reasons as well.

At operation 205, the external entity 150 may receive a public IP address for a first component 110 in a network 105 and a mapping of public IP addresses to private IP addresses for a set of components in the network 105. The mapping of IP addresses may be in the form of a NAT configuration file or another format. In some embodiments, the mapping information may include additional information needed by a NAT server to route traffic to and from the appropriate component in the network 105 (e.g., port information).

Using the public IP address of the first component 110, the external entity 150 may transmit a request for first network information from the first component 110 in the network 105 at operation 210. The external entity 150 may receive a response from the first component that includes the first network information. The first network information may include information that may be used by the external entity 150 to perform one or more network management tasks and/or services. The first network information may also a list of other components 115A-D in the network 105 and their respective private IP address information. In some cases, the first component 110 may only have access to private IP address information for the other components 115A-D in the network 105 because only private IP address information is used within the network 105 to communicate between components. However, because the external entity 150 is located on the other side of the NAT server 120, the external entity 150 needs public IP address information to properly communicate with the components within the network 105.

Accordingly, at operation 215, the external entity 150 translates the private IP address for a second component (e.g., component 115A) to a public IP address for the second component. The external entity 150 may use the public IP address to communicate with the second component. For example, at operation 220, the external entity 150 may request second network information from the second component using the public IP address for the second component. The second network information may also include information that may be used by the external entity 150 to perform one or more network management tasks and/or services. The external entity 150 may similarly retrieve network information for one or more of the remaining components (e.g., components 115B-D) in the network 105.

For example, at operation 225, the external entity 150 may perform network management services for the network based on the first network information, the second network information, and or a combination. In some cases, the first network information from the first component 110 is different from the second network information from the second component (e.g., component 115A) and/or first and second network information may be used to provide additional network management services of services of better quality.

A variety of network management services may be provided in this manner by one or more external entities. Various aspects of the subject technology relate to network assurance services and, in particular, the case where network 105 is in a data center environment. Network configurations for large data center networks are often specified at a centralized controller. The controller can program switches, routers, servers, and elements in the network according to the specified network configurations.

Network configurations are inherently very complex, and involve low level as well as high level configurations of several layers of the network such as access policies, forwarding policies, routing policies, security policies, quality of service (QoS) policies, etc. Given such complexity, the network configuration process is error prone. The configurations are defined on a controller and can reflect an intent specification for the network. In many cases, the configurations can contain errors and inconsistencies that are often extremely difficult to identify and may create significant problems in the network. Furthermore, for various reasons, the configurations defined on the controller may be or become inconsistent with the implementation of the intent specification on network nodes.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, settings, configurations, etc., defined for the network and individual network elements (e.g., switches, routers, applications, resources, etc.). However, often times, the configurations, policies, etc., defined by a network operator are incorrect or not accurately reflected in the actual behavior of the network.

For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a virtual extensible LAN (VXLAN) or software-defined network (SDN) (e.g., Application Centric Infrastructure (ACI) or VMware NSX networks); etc.

In some embodiments, the network assurance approaches may be implemented on a network assurance appliance/engine hosted on an entity (e.g., external entity 105 of FIG. 1) external to the network (e.g., network 105 of FIG. 1) being assured. As will be described in further detail, the network assurance appliance may be configured to communicate with the components (e.g., components 110 and 115A-D of FIG. 1) to obtain various network assurance information in order to generate network models, generate events, and provide other assurance services. The components of the network may include network controllers, leaf nodes, spine nodes, etc. Furthermore, the network may also include a NAT server (e.g., NAT server 120 of FIG. 1) through which communications between the network assurance appliance and the components of the network occur.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The modeling can consume numerous types of smart events which model a large amount of behavioral aspects of the network. Smart events can impact various aspects of the network, such as underlay services, overlay services, tenant connectivity, tenant security, tenant end point (EP) mobility, tenant policy, tenant routing, resources, etc. Having described various aspects of network assurance, the disclosure now turns to a discussion of example network environments for network assurance.

Figure 3A:
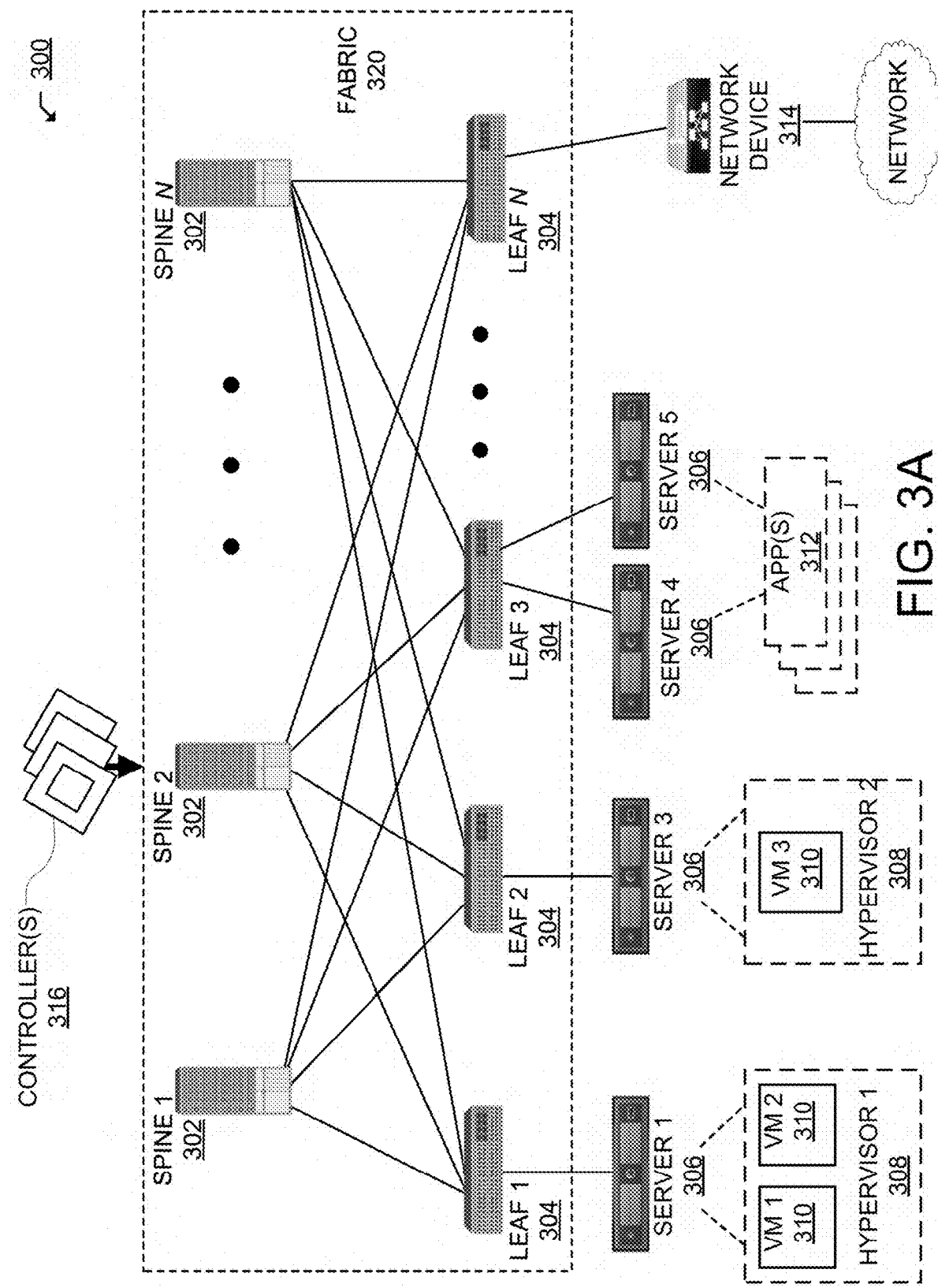
FIG. 3A illustrates an example data center network, in accordance with various aspects of the subject technology.

FIG. 3A illustrates an example data center network 300, in accordance with various aspects of the subject technology. In particular, the network 105 of FIG. 1 may, in some embodiments, be implemented as a data center network such as the data center network 300 shown in FIG. 3A, The data center network 300 can include a Fabric 320 which can represent the physical layer or infrastructure (e.g., underlay) of the data center network 300. Fabric 320 can include Spines 302 (e.g., spine routers or switches) and Leafs 304 (e.g., leaf routers or switches) which can be interconnected for routing or switching traffic in the Fabric 320. Spines 302 can interconnect Leafs 304 in the Fabric 320, and Leafs 304 can connect the Fabric 320 to an overlay or logical portion of the data center network 300, which can include application services, servers, virtual machines, containers, endpoints, etc. Thus, network connectivity in the Fabric 320 can flow from Spines 302 to Leafs 304, and vice versa. The interconnections between Leafs 304 and Spines 302 can be redundant (e.g., multiple interconnections) to avoid a failure in routing. In some embodiments, Leafs 304 and Spines 302 can be fully connected, such that any given Leaf is connected to each of the Spines 302, and any given Spine is connected to each of the Leafs 304. Leafs 304 can be, for example, top-of-rack ("ToR") switches, aggregation switches, gateways, ingress and/or egress switches, provider edge devices, and/or any other type of routing or switching device.

Leafs 304 can be responsible for routing and/or bridging tenant or customer packets and applying network policies or rules. Network policies and rules can be driven by one or more Controllers 316, and/or implemented or enforced by one or more devices, such as Leafs 304. Leafs 304 can connect other elements to the Fabric 320. For example, Leafs 304 can connect Servers 306, Hypervisors 308, Virtual Machines (VMs) 310, Applications 312, Network Device 314, etc., with Fabric 320. Such elements can reside in one or more logical or virtual layers or networks, such as an overlay network. In some cases, Leafs 304 can encapsulate and decapsulate packets to and from such elements (e.g., Servers 306) in order to enable communications throughout Data center network 300 and Fabric 320. Leafs 304 can also provide any other devices, services, tenants, or workloads with access to Fabric 320. In some cases, Servers 306 connected to Leafs 304 can similarly encapsulate and decapsulate packets to and from Leafs 304. For example, Servers 306 can include one or more virtual switches or routers or tunnel endpoints for tunneling packets between an overlay or logical layer hosted by, or connected to, Servers 306 and an underlay layer represented by Fabric 320 and accessed via Leafs 304.

Applications 312 can include software applications, services, containers, appliances, functions, service chains, etc. For example, Applications 312 can include a firewall, a database, a content delivery network (CDN) server, an intrusion defense system (IDS) or intrusion prevention system (IPS), a deep packet inspection service, a message router, a virtual switch, etc. An application from Applications 312 can be distributed, chained, or hosted by multiple endpoints (e.g., Servers 306, VMs 310, etc.), or may run or execute entirely from a single endpoint.

VMs 310 can be virtual machines hosted by Hypervisors 308 or virtual machine managers running on Servers 306. VMs 310 can include workloads running on a guest operating system on a respective server. Hypervisors 308 can provide a layer of software, firmware, and/or hardware that creates, manages, and/or runs the VMs 310. Hypervisors 308 can allow VMs 310 to share hardware resources on Servers 306, and the hardware resources on Servers 306 to appear as multiple, separate hardware platforms. Moreover, Hypervisors 308 on Servers 306 can host one or more VMs 310.

In some cases, VMs 310 and/or Hypervisors 308 can be migrated to other Servers 306. Servers 306 can similarly be migrated to other locations in Data center network 300. For example, a server connected to a specific leaf can be changed to connect to a different or additional leaf. Such configuration or deployment changes can involve modifications to settings, configurations, and policies that are applied to the resources being migrated as well as other network components.

In some cases, one or more Servers 306, Hypervisors 308, and/or VMs 310 can represent or reside in a tenant or customer space. Tenant space can include workloads, services, applications, devices, networks, and/or resources that are associated with one or more clients or subscribers. Accordingly, traffic in Data center network 300 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security, and configuration information between tenants can be managed by Controllers 316, Servers 306, Leafs 304, etc.

Configurations in Data center network 300 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 316, which can implement or propagate such configurations through Data center network 300. In some examples, Controllers 316 can be Application Policy Infrastructure Controllers (APICs) in an ACI framework. In other examples, Controllers 316 can be one or more management components for associated with other SDN solutions, such as NSX Managers.

Such configurations can define rules, policies, priorities, protocols, attributes, objects, etc., for routing and/or classifying traffic in Data center network 300. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Data center network 300, such as Leafs 304, Servers 306, Hypervisors 308, Controllers 316, etc. As previously explained, Data center network 300 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Data center network 300. Endpoints can have one or more attributes such as a VM name, guest OS name, a security tag, application profile, etc. Application configurations can be applied between EPGs, instead of endpoints directly, in the form of contracts. Leafs 304 can classify incoming traffic into different EPGs. The classification can be based on, for example, a network segment identifier such as a VLAN ID, VXLAN Network Identifier (VNID), Network Virtualization using Generic Routing Encapsulation (NVGRE) Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 304 can tie packets with their attribute EPGs based on their identifiers and enforce policies, which can be implemented and/or managed by one or more Controllers 316. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database, and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, and database VMs). DFW rules can be configured to implement policies for the specific security groups. To illustrate, in the context of the previous example, DFW rules can be configured to block HTTP traffic between web, application, and database security groups.

Returning now to FIG. 1A, Data center network 300 can deploy different hosts via Leafs 304, Servers 306, Hypervisors 308, VMs 310, Applications 312, and Controllers 316, such as VMWARE ESXi hosts, WINDOWS HYPER-V hosts, bare metal physical hosts, etc. Data center network 300 may interoperate with a variety of Hypervisors 308, Servers 306 (e.g., physical and/or virtual servers), SDN orchestration platforms, etc. Data center network 300 may implement a declarative model to allow its integration with application design and holistic network policy.

Controllers 316 can provide centralized access to fabric information, application configuration, resource configuration, application-level configuration modeling for a software-defined network (SDN) infrastructure, integration with management systems or servers, etc. Controllers 316 can form a control plane that interfaces with an application plane via northbound APIs and a data plane via southbound APIs.

As previously noted, Controllers 316 can define and manage application-level model(s) for configurations in data center network 300. In some cases, application or device configurations can also be managed and/or defined by other components in the network. For example, a hypervisor or virtual appliance, such as a VM or container, can run a server or management tool to manage software and services in Data center network 300, including configurations and settings for virtual appliances.

As illustrated above, data center network 300 can include one or more different types of SDN solutions, hosts, etc. For the sake of clarity and explanation purposes, various examples in the disclosure will be described with reference to an ACI framework, and Controllers 316 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 306 (e.g., physical or logical), Hypervisors 308, VMs 310, containers (e.g., Applications 312), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 3B:
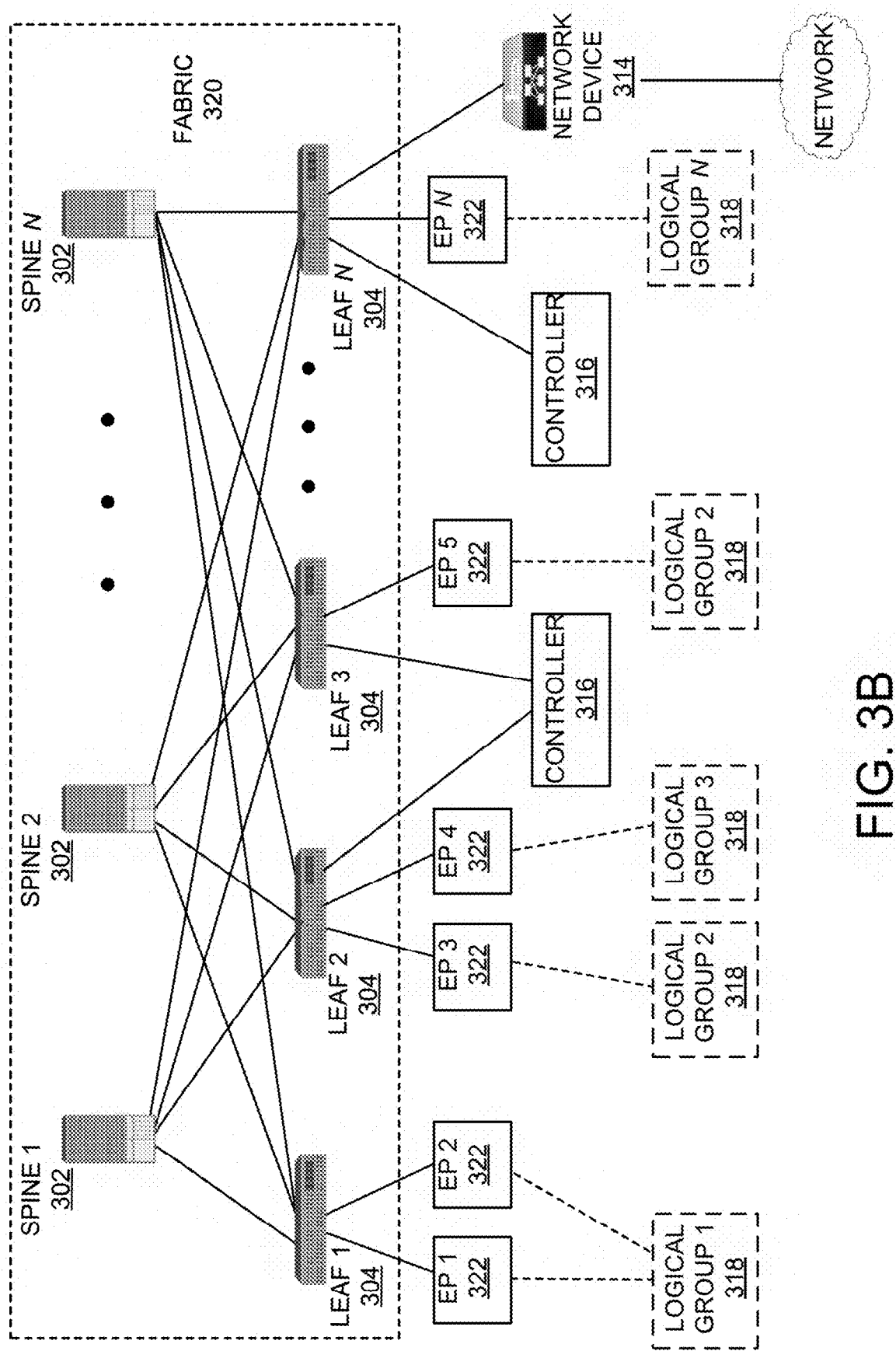
FIG. 3B illustrates another example of a data center network, in accordance with various aspects of the subject technology.

FIG. 3B illustrates another example of a data center network 300, in accordance with various aspects of the subject technology. In this example, data center network 300 includes Endpoints 322 connected to Leafs 304 in Fabric 320. Endpoints 322 can be physical and/or logical or virtual entities, such as servers, clients, VMs, hypervisors, software containers, applications, resources, network devices, workloads, etc. For example, an Endpoint 322 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 322 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 322 can be associated with respective Logical Groups 318. Logical Groups 318 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 318 are EPGs in an ACI environment and/or other logical groups (e.g., SGs) in another SDN environment.

Traffic to and/or from Endpoints 322 can be classified, processed, managed, etc., based Logical Groups 318. For example, Logical Groups 318 can be used to classify traffic to or from Endpoints 322, apply policies to traffic to or from Endpoints 322, define relationships between Endpoints 322, define roles of Endpoints 322 (e.g., whether an endpoint consumes or provides a service, etc.), apply rules to traffic to or from Endpoints 322, apply filters or access control lists (ACLs) to traffic to or from Endpoints 322, define communication paths for traffic to or from Endpoints 322, enforce requirements associated with Endpoints 322, implement security and other configurations associated with Endpoints 322, etc.

In an ACI environment, Logical Groups 318 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 4A:
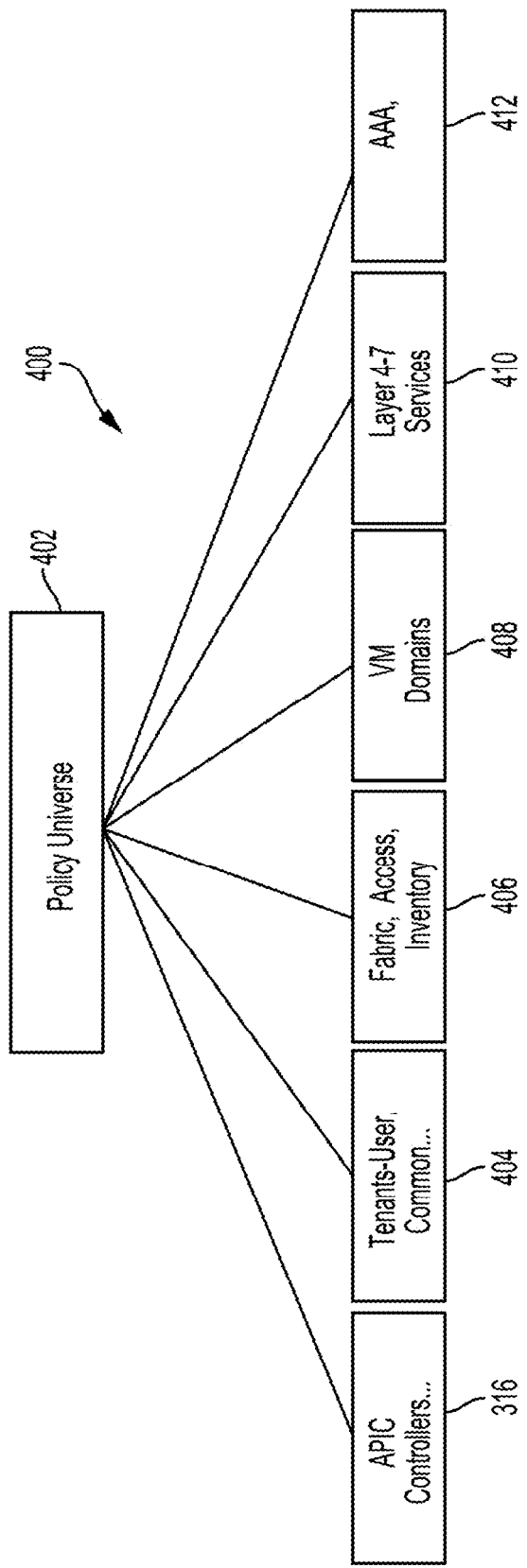
FIG. 4A illustrates an example object model for a network, in accordance with various aspects of the subject technology.

FIG. 4A illustrates an example object model for a network, in accordance with various aspects of the subject technology. In particular, FIG. 4A illustrates a diagram of an example Management Information Model 400 for an SDN network, such as data center network 300. The following discussion of Management Information Model 400 references various terms which shall also be used throughout the disclosure. Accordingly, for clarity, the disclosure shall first provide below a list of terminology, which will be followed by a more detailed discussion of Management Information Model 400.

As used herein, an "Alias" can refer to a changeable name for a given object. Thus, even if the name of an object, once created, cannot be changed, the Alias can be a field that can be changed.

As used herein, the term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 overlaps Contract 1. In this example, by aliasing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 316) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endpoints as previously described with reference to FIG. 3B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 320) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Data center network 300). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 320) resource.

As used herein, the term "Management Information Tree" (MIT) can refer to a hierarchical management information tree containing the MOs of a system. For example, in ACI, the MIT contains the MOs of the ACI fabric (e.g., Fabric 320). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 320 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 400 in FIG. 4A. As previously noted, MIM 400 can be a hierarchical management information tree or MIT. Moreover, MIM 400 can be managed and processed by Controllers 316, such as APICs in an ACI. Controllers 316 can enable the control of managed resources by presenting their manageable characteristics as object properties that can be inherited according to the location of the object within the hierarchical structure of the model.

The hierarchical structure of MIM 400 starts with Policy Universe 202 at the top (Root) and contains parent and child nodes 316, 204, 206, 208, 210, 212. Nodes 116, 202, 204, 206, 208, 210, 212 in the tree represent the managed objects (MOs) or groups of objects. Each object in the fabric (e.g., Fabric 320) has a unique distinguished name (DN) that describes the object and locates its place in the tree. The Nodes 316, 202, 204, 206, 208, 210, 212 can include the various MOs, as described below, which contain policies that govern the operation of the system.

Controllers 316

Controllers 316 (e.g., APIC controllers) can provide management, policy programming, application deployment, and health monitoring for Fabric 320.

Node 404

Node 404 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 406

Node 406 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 304.

Node 406 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 408

Node 408 can contain VM domains that group VM controllers with similar networking policy requirements. VM controllers can share virtual space (e.g., VLAN or VXLAN space) and application EPGs. Controllers 316 communicate with the VM controller to publish network configurations such as port groups that are then applied to the virtual workloads.

Node 410

Node 410 can contain Layer 4 to Layer 7 service integration life cycle automation framework that enables the system to dynamically respond when a service comes online or goes offline. Policies can provide service device package and inventory management functions.

Node 412

Node 412 can contain access, authentication, and accounting (AAA) policies that govern user privileges, roles, and security domains of Fabric 320.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 4B:
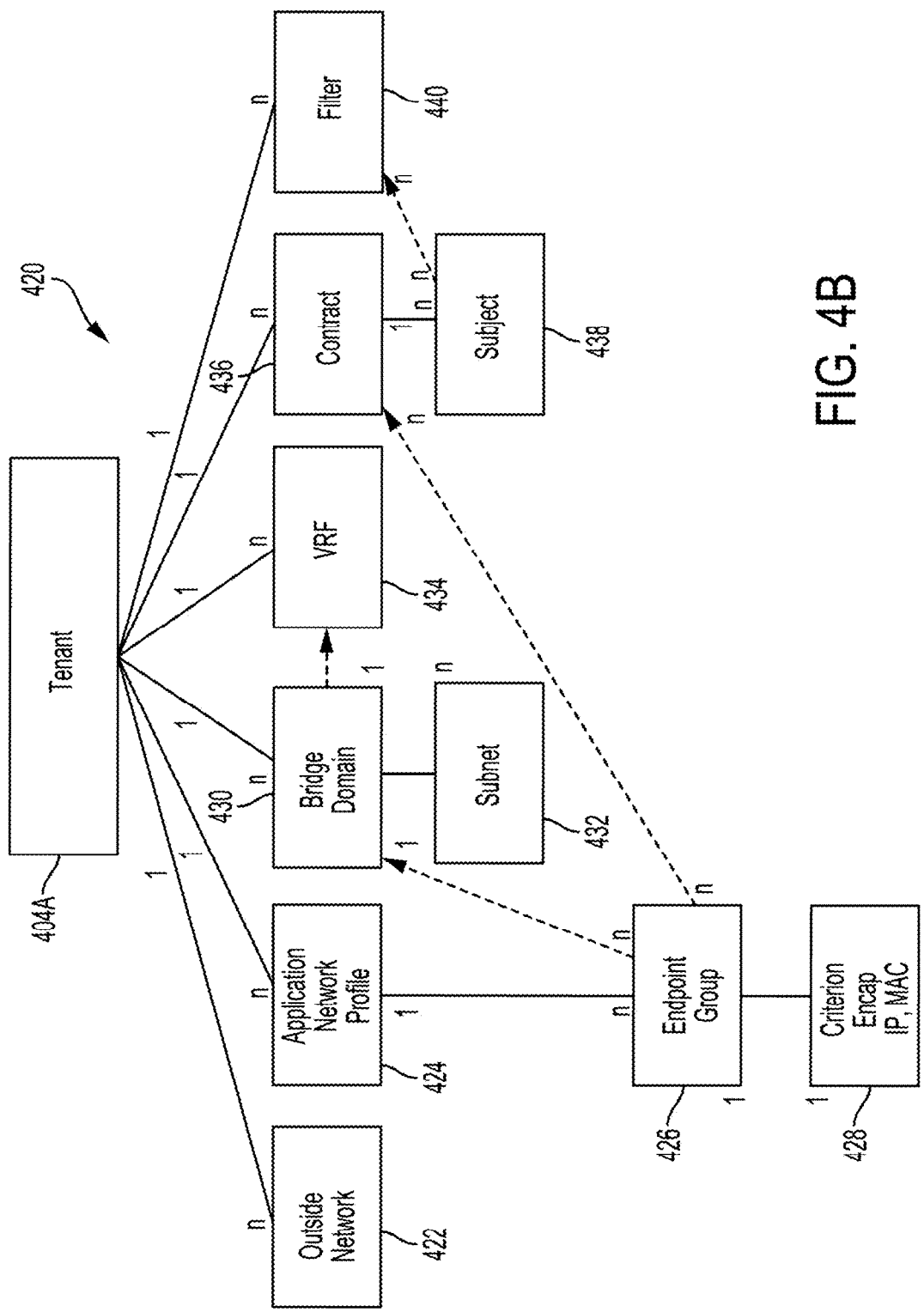
FIG. 4B illustrates an example object model for a tenant object, in accordance with various aspects of the subject technology.

FIG. 4B illustrates an example object model for a tenant object, in accordance with various aspects of the subject technology. FIG. 4B includes an example object model 420 for a tenant portion of MIM 400. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization, or domain in an enterprise setting, or just a convenient grouping of policies. Moreover, tenants can be isolated from one another or can share resources.

Tenant portion 404A of MIM 400 can include various entities, and the entities in Tenant Portion 404A can inherit policies from parent entities. Non-limiting examples of entities in Tenant Portion 404A can include Filters 440, Contracts 436, Outside Networks 422, Bridge Domains 430, VRF Instances 434, and Application Profiles 424.

Bridge Domains 430 can include Subnets 432. Contracts 436 can include Subjects 438. Application Profiles 424 can contain one or more EPGs 426. Some applications can contain multiple components. For example, an e-commerce application could require a web server, a database server, data located in a storage area network, and access to outside resources that enable financial transactions. Application Profile 424 contains as many (or as few) EPGs as necessary that are logically related to providing the capabilities of an application.

EPG 426 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 426 can also contain Attributes 428, such as encapsulation-based EPGs, IP-based EPGs, or MAC-based EPGs.

As previously mentioned, EPGs can contain endpoints (e.g., EPs 322) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 316, or dynamically configured by an automated system such as VCENTER or OPENSTACK.

To activate tenant policies in Tenant Portion 404A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 4C:
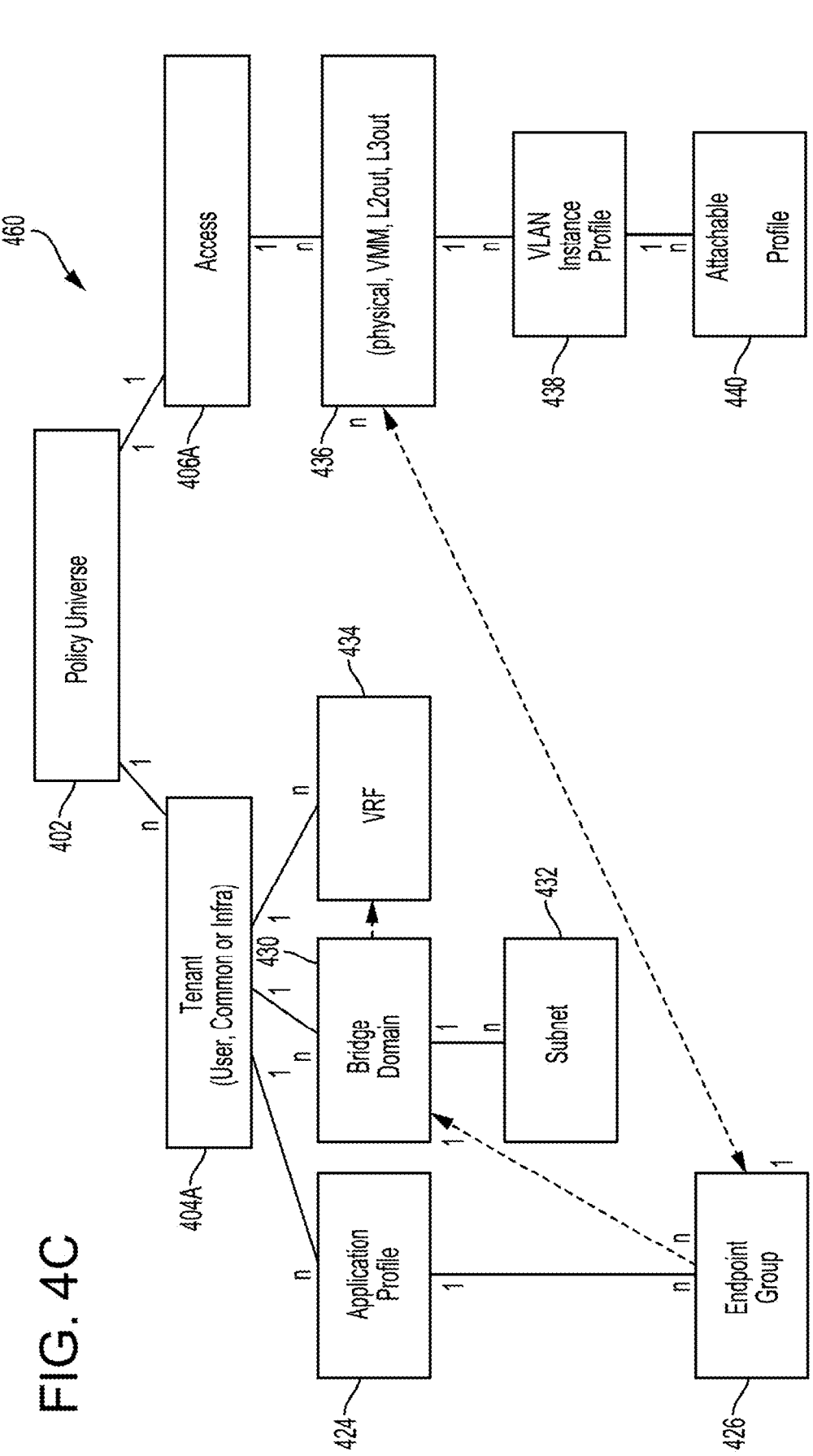
FIG. 4C illustrates an example association of various objects, in accordance with various aspects of the subject technology.

FIG. 4C illustrates an example association of various objects, in accordance with various aspects of the subject technology. In particular, FIG. 4C includes an example Association 460 of tenant entities and access entities in MIM 400. Policy Universe 402 contains Tenant Portion 404A and Access Portion 406A. Thus, Tenant Portion 404A and Access Portion 406A are associated through Policy Universe 402.

Access Portion 406A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 406A thus contains Domain Profile 436 which can define a physical, VMM, L2 out, L3 out, or Fiber Channel domain, for example, to be associated to the EPGs. Domain Profile 436 contains VLAN Instance Profile 438 (e.g., VLAN pool) and Attacheable Access Entity Profile (AEP) 440, which are associated directly with application EPGs. The AEP 440 deploys the associated application EPGs to the ports to which it is attached, and automates the task of assigning VLANs. While a large data center can have thousands of active VMs provisioned on hundreds of VLANs, Fabric 320 can automatically assign VLAN IDs from VLAN pools. This saves time compared with trunking down VLANs in a traditional data center.

Figure 4D:
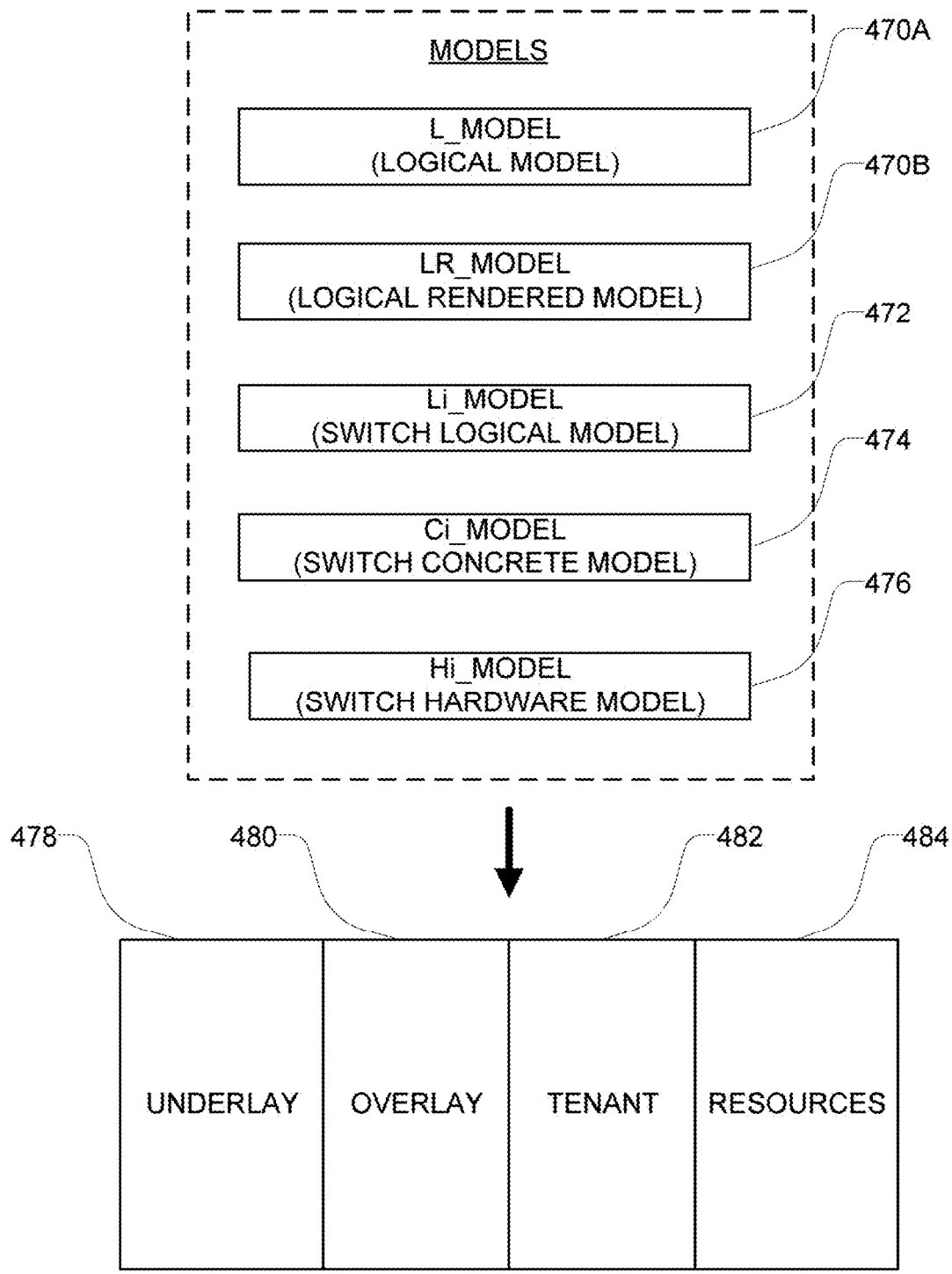
FIG. 4D illustrates a schematic diagram of example models for implementing MIM, in accordance with various aspects of the subject technology.

FIG. 4D illustrates a schematic diagram of example models for implementing MIM 400, in accordance with various aspects of the subject technology. The network assurance models can include L_Model 470A (Logical Model), LR_Model 470B (Logical Rendered Model or Logical Runtime Model), Li_Model 472 (Logical Model for i), Ci_Model 474 (Concrete model for i), and Hi_Model 476 (Hardware model or TCAM Model for i).

L_Model 470A is the logical representation of the objects and their relationships in MIM 400. L_Model 470A can be generated by Controllers 316 based on configurations entered in Controllers 316 for the network, and thus represents the configurations of the network at Controllers 316. This is the declaration of the "end-state" expression that is desired when the elements of the network entities (e.g., applications) are connected and Fabric 320 is provisioned by Controllers 316. In other words, because L_Model 470A represents the configurations entered in Controllers 316, including the objects and relationships in MIM 400, it can also reflect the "intent" of the administrator: how the administrator wants the network and network elements to behave.

LR_Model 470B is the abstract model expression that Controllers 316 (e.g., APICs in ACI) resolve from L_Model 470A. LR_Model 470B can thus provide the elemental configuration components that would be delivered to the physical infrastructure (e.g., Fabric 320) to execute one or more policies. For example, LR_Model 470B can be delivered to Leafs 304 in Fabric 320 to configure Leafs 304 for communication with attached Endpoints 322.

Li_Model 472 is a switch-level or switch-specific model obtained from Logical Model 470A and/or Resolved Model 470B. For example, Li_Model 472 can represent the portion of L_Model 470A and/or LR_Model 470B pertaining to a specific switch or router i. To illustrate, Li_Model 472 Li can represent the portion of L_Model 470A and/or LR_Model 470B pertaining to Leaf 1 (104). Thus, Li_Model 472 can be generated from L_Model 470A and/or LR_Model 470B for one or more switch or routers (e.g., Leafs 304 and/or Spines 302) on Fabric 320.

Ci_Model 474 is the actual in-state configuration at the individual fabric member i (e.g., switch i). In other words, Ci_Model 474 is a switch-level or switch-specific model that is based on Li_Model 472. For example, Controllers 316 can deliver Li_Model 472 to Leaf 1 (104). Leaf 1 (104) can take Li_Model 472, which can be specific to Leaf 1 (104), and render the policies in Li_Model 472 into a concrete model, Ci_Model 474, that runs on Leaf 1 (104). Leaf 1 (104) can render Li_Model 472 via the OS on Leaf 1 (104), for example. Thus, Ci_Model 474 can be analogous to compiled software, as it is the form of Li_Model 472 that the switch OS at Leaf 1 (104) can execute.

Hi_Model 476 is also a switch-level or switch-specific model for switch i, but is based on Ci_Model 474 for switch i. Hi_Model 476 is the actual configuration (e.g., rules) stored or rendered on the hardware or memory (e.g., TCAM memory) at the individual fabric member i (e.g., switch i). For example, Hi_Model 476 can represent the configurations (e.g., rules) which Leaf 1 (104) stores or renders on the hardware (e.g., TCAM memory) of Leaf 1 (104) based on Ci_Model 474 at Leaf 1 (104). The switch OS at Leaf 1 (104) can render or execute Ci_Model 474, and Leaf 1 (104) can store or render the configurations from Ci_Model in storage, such as the memory or TCAM at Leaf 1 (104). The configurations from Hi_Model 476 stored or rendered by Leaf 1 (104) represent the configurations that will be implemented by Leaf 1 (104) when processing traffic.

While Models 472, 474, 476 are shown as device-specific models, similar models can be generated or aggregated for a collection of fabric members (e.g., Leafs 304 and/or Spines 302) in Fabric 320. When combined, device-specific models, such as Model 472, Model 474, and/or Model 476, can provide a representation of Fabric 320 that extends beyond a particular device. For example, in some cases, Li_Model 472, Ci Model 472, and/or Hi Model 472 associated with some or all individual fabric members (e.g., Leafs 304 and Spines 302) can be combined or aggregated to generate one or more aggregated models based on the individual fabric members.

As referenced herein, the terms H Model, T Model, and TCAM Model can be used interchangeably to refer to a hardware model, such as Hi_Model 476. For example, Ti Model, Hi Model and TCAMi Model may be used interchangeably to refer to Hi_Model 476.

Models 470A, 470B, 472, 474, 476 can provide representations of various aspects of the network or various configuration stages for MIM 400. For example, one or more of Models 470A, 470B, 472, 474, 476 can be used to generate Underlay Model 478 representing one or more aspects of Fabric 320 (e.g., underlay topology, routing, etc.), Overlay Model 480 representing one or more aspects of the overlay or logical segment(s) of Data center network 300 (e.g., COOP, MPBGP, tenants, VRFs, VLANs, VXLANs, virtual applications, VMs, hypervisors, virtual switching, etc.), Tenant Model 482 representing one or more aspects of Tenant portion 404A in MIM 400 (e.g., security, forwarding, service chaining, QoS, VRFs, BDs, Contracts, Filters, EPGs, subnets, etc.), Resources Model 484 representing one or more resources in Data center network 300 (e.g., storage, computing, VMs, port channels, physical elements, etc.), etc.

In general, L_Model 470A can be the high-level expression of what exists in the LR_Model 470B, which should be present on the concrete devices as Ci_Model 474 and Hi_Model 476 expression. If there is any gap between the models, there may be inconsistent configurations or problems.

Figure 5A:
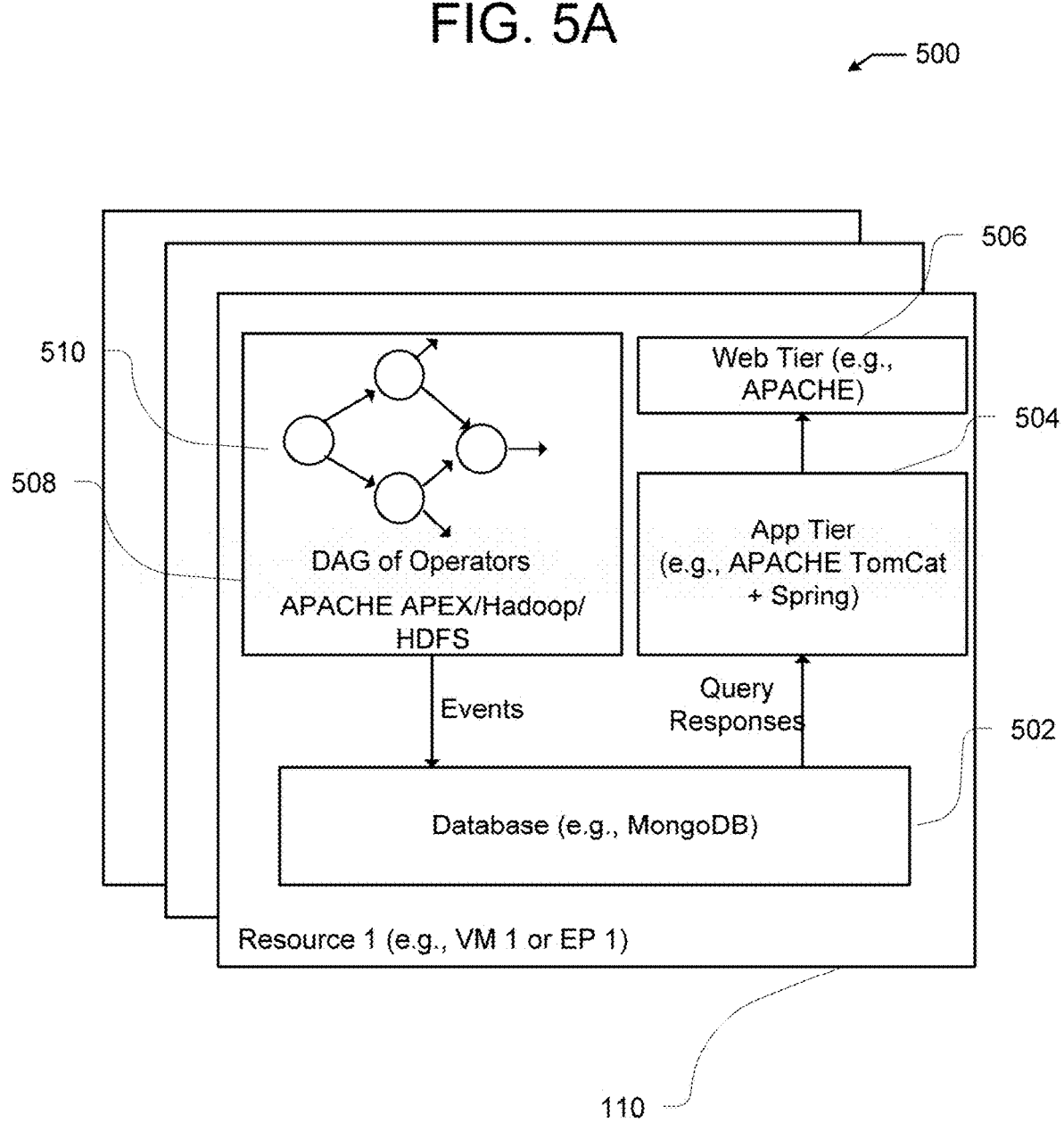
FIG. 5A illustrates a diagram of an example Assurance Appliance for network assurance, in accordance with various aspects of the subject technology.

FIG. 5A illustrates a diagram of an example Assurance Appliance 500 for network assurance, in accordance with various aspects of the subject technology. In this example, Assurance Appliance 500 can include k VMs 510 operating in cluster mode. VMs are used in this example for explanation purposes. However, it should be understood that other configurations are also contemplated herein, such as use of containers, bare metal devices, Endpoints 322, or any other physical or logical systems. Moreover, while FIG. 5A illustrates a cluster mode configuration, other configurations are also contemplated herein, such as a single mode configuration (e.g., single VM, container, or server) or a service chain for example.

Assurance Appliance 500 can run on one or more Servers 306, VMs 310, Hypervisors 308, EPs 322, Leafs 304, Controllers 316, or any other system or resource. For example, Assurance Appliance 500 can be a logical service or application running on one or more VMs 310 in data center network 300.

The Assurance Appliance 500 can include Data Framework 508, which can be based on, for example, APACHE APEX and HADOOP. In some cases, assurance checks can be written as individual operators that reside in Data Framework 508. This enables a natively horizontal scale-out architecture that can scale to arbitrary number of switches in Fabric 320 (e.g., ACI fabric).

Assurance Appliance 500 can poll Fabric 320 at a configurable periodicity (e.g., an epoch). The analysis workflow can be setup as a DAG (Directed Acyclic Graph) of Operators 510, where data flows from one operator to another and eventually results are generated and persisted to Database 502 for each interval (e.g., each epoch).

The north-tier implements API Server (e.g., APACHE Tomcat and Spring framework) 504 and Web Server 506. A graphical user interface (GUI) interacts via the APIs exposed to the customer. These APIs can also be used by the customer to collect data from Assurance Appliance 500 for further integration into other tools.

Operators 510 in Data Framework 508 (e.g., APEX/Hadoop) can together support assurance operations. Below are non-limiting examples of assurance operations that can be performed by Assurance Appliance 500 via Operators 510.

Security Policy Adherence

Assurance Appliance 500 can check to make sure the configurations or specification from L_Model 470A, which may reflect the user's intent for the network, including for example the security policies and customer-configured contracts, are correctly implemented and/or rendered in Li_Model 472, Ci_Model 474, and Hi_Model 476, and thus properly implemented and rendered by the fabric members (e.g., Leafs 304), and report any errors, contract violations, or irregularities found.

Static Policy Analysis

Assurance Appliance 500 can check for issues in the specification of the user's intent or intents (e.g., identify contradictory or conflicting policies in L_Model 470A).

TCAM Utilization

TCAM is a scarce resource in the fabric (e.g., Fabric 320). However, Assurance Appliance 500 can analyze the TCAM utilization by the network data (e.g., Longest Prefix Match (LPM) tables, routing tables, VLAN tables, BGP updates, etc.), Contracts, Logical Groups 318 (e.g., EPGs), Tenants, Spines 302, Leafs 304, and other dimensions in Data center network 300 and/or objects in MIM 400, to provide a network operator or user visibility into the utilization of this scarce resource. This can greatly help for planning and other optimization purposes.

Endpoint Checks

Assurance Appliance 500 can validate that the fabric (e.g., fabric 320) has no inconsistencies in the Endpoint information registered (e.g., two leafs announcing the same endpoint, duplicate subnets, etc.), among other such checks.

Tenant Routing Checks

Assurance Appliance 500 can validate that BDs, VRFs, subnets (both internal and external), VLANs, contracts, filters, applications, EPGs, etc., are correctly programmed.

Infrastructure Routing

Assurance Appliance 500 can validate that infrastructure routing (e.g., IS-IS protocol) has no convergence issues leading to black holes, loops, flaps, and other problems.

MP-BGP Route Reflection Checks

The network fabric (e.g., Fabric 320) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis

Assurance Appliance 500 can validate rules in the specification of the network (e.g., L_Model 470A) are complete and do not have inconsistencies or other problems. MOs in the MIM 400 can be checked by Assurance Appliance 500 through syntactic and semantic checks performed on L_Model 470A and/or the associated configurations of the MOs in MIM 400. Assurance Appliance 500 can also verify that unnecessary, stale, unused or redundant configurations, such as contracts, are removed.

Figure 5B:
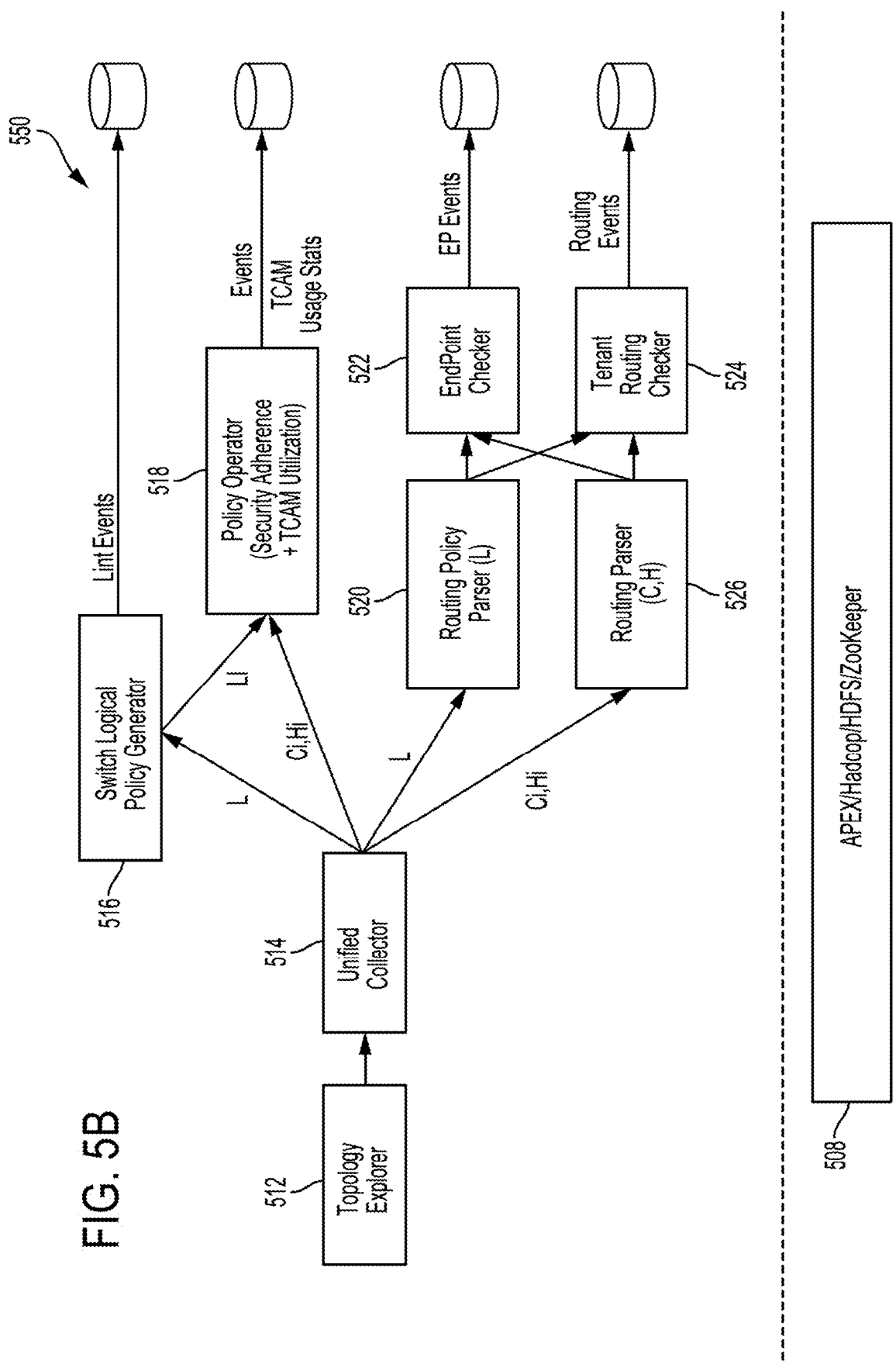
FIG. 5B illustrates an architectural diagram of an example system for network assurance, in accordance with various aspects of the subject technology.

FIG. 5B illustrates an architectural diagram of an example system 550 for network assurance, in accordance with various aspects of the subject technology. In some cases, system 550 can correspond to the DAG of Operators 510 previously discussed with respect to FIG. 5A. In this example, Topology Explorer 512 communicates with Controllers 316 (e.g., APIC controllers) in order to discover or otherwise construct a comprehensive topological view of Fabric 320 (e.g., Spines 302, Leafs 304, Controllers 316, Endpoints 322, and any other components as well as their interconnections). While various architectural components are represented in a singular, boxed fashion, it is understood that a given architectural component, such as Topology Explorer 512, can correspond to one or more individual Operators 510 and may include one or more nodes or endpoints, such as one or more servers, VMs, containers, applications, service functions (e.g., functions in a service chain or virtualized network function), etc.

Topology Explorer 512 is configured to discover nodes in Fabric 320, such as Controllers 316, Leafs 304, Spines 302, etc. Topology Explorer 512 can additionally detect a majority election performed amongst Controllers 316, and determine whether a quorum exists amongst Controllers 316. If no quorum or majority exists, Topology Explorer 512 can trigger an event and alert a user that a configuration or other error exists amongst Controllers 316 that is preventing a quorum or majority from being reached. Topology Explorer 512 can detect Leafs 304 and Spines 302 that are part of Fabric 320 and publish their corresponding out-of-band management network addresses (e.g., IP addresses) to downstream services. This can be part of the topological view that is published to the downstream services at the conclusion of Topology Explorer's 512 discovery epoch (e.g., 5 minutes, or some other specified interval).

Unified Collector 514 can receive the topological view from Topology Explorer 512 and use the topology information to collect information for network assurance from Fabric 320. Such information can include L_Model 470A and/or LR_Model 470B from Controllers 316, switch software configurations (e.g., Ci_Model 474) from Leafs 304 and/or Spines 302, hardware configurations (e.g., Hi_Model 476) from Leafs 304 and/or Spines 302, etc. Unified Collector 314 can collect Ci_Model 474 and Hi_Model 476 from individual fabric members (e.g., Leafs 304 and Spines 302).

Unified Collector 514 can poll the devices that Topology Explorer 512 discovers in order to collect data from Fabric 320 (e.g., from the constituent members of the fabric). Unified Collector 314 can collect the data using interfaces exposed by Controller 116 and/or switch software (e.g., switch OS), including, for example, a Representation State Transfer (REST) Interface and a Secure Shell (SSH) Interface.

In some cases, Unified Collector 514 collects L_Model 470A, LR_Model 470B, and/or Ci_Model 474 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 514 can poll other information from Controllers 316, including: topology information, tenant forwarding/routing information, tenant security policies, contracts, interface policies, physical domain or VMM domain information, OOB (out-of-band) management IP's of nodes in the fabric, etc.

Unified Collector 514 can also poll other information from Leafs 304 and Spines 302, such as: Ci Models 474 for VLANs, BDs, security policies, Link Layer Discovery Protocol (LLDP) connectivity information of Leafs 304 and/or Spines 302, endpoint information from EPM/COOP, fabric card information from Spines 302, routing information base (RIB) tables, forwarding information base (FIB) tables from Leafs 304 and/or Spines 302, security group hardware tables (e.g., TCAM tables) from switches, etc.

Assurance Appliance 500 can run one or more instances of Unified Collector 514. For example, Assurance Appliance 500 can run one, two, three, or more instances of Unified Collector 514. The task of data collecting for each node in the topology (e.g., Fabric 320 including Spines 302, Leafs 304, Controllers 316, etc.) can be sharded or load balanced, to a unique instance of Unified Collector 514. Data collection across the nodes can thus be performed in parallel by one or more instances of Unified Collector 514. Within a given node, commands and data collection can be executed serially. Assurance Appliance 500 can control the number of threads used by each instance of Unified Collector 514 to poll data from Fabric 320.

Data collected by Unified Collector 514 can be compressed and sent to downstream services. In some examples, Unified Collector 514 can collect data in an online fashion or real-time fashion, and send the data downstream, as it is collected, for further analysis. In some examples, Unified Collector 514 can collect data in an offline fashion, and compile the data for later analysis or transmission.

Assurance Appliance 500 can contact Controllers 316, Spines 302, Leafs 304, and other nodes to collect various types of data. In some scenarios, Assurance Appliance 500 may experience a failure (e.g., connectivity problem, hardware or software error, etc.) that prevents it from being able to collect data for a period of time. Assurance Appliance 500 can handle such failures seamlessly, and generate events based on such failures.

Switch Logical Policy Generator 516 can receive L_Model 470A and/or LR_Model 470B from Unified Collector 514 and calculate Li_Model 472 for each network device i (e.g., switch i) in Fabric 320. For example, Switch Logical Policy Generator 516 can receive L_Model 470A and/or LR_Model 470B and generate Li_Model 472 by projecting a logical model for each individual node i (e.g., Spines 302 and/or Leafs 304) in Fabric 320. Switch Logical Policy Generator 516 can generate Li_Model 472 for each switch in Fabric 320, thus creating a switch logical model based on L_Model 470A for each switch.

Switch Logical Configuration Generator 516 can also perform change analysis and generate lint events or records for problems discovered in L_Model 470A and/or LR_Model 470B. The lint events or records can be used to generate alerts for a user or network operator.

Policy Operator 518 can receive Ci_Model 474 and Hi_Model 476 for each switch from Unified Collector 514, and Li_Model 472 for each switch from Switch Logical Policy Generator 516, and perform assurance checks and analysis (e.g., security adherence checks, TCAM utilization analysis, etc.) based on Ci_Model 474, Hi_Model 476, and Li_Model 472. Policy Operator 518 can perform assurance checks on a switch-by-switch basis by comparing one or more of the models.

Returning to Unified Collector 514, Unified Collector 514 can also send L_Model 470A and/or LR_Model 470B to Routing Policy Parser 520, and Ci_Model 474 and Hi_Model 476 to Routing Parser 526.

Routing Policy Parser 520 can receive L_Model 470A and/or LR_Model 470B and parse the model(s) for information that may be relevant to downstream operators, such as Endpoint Checker 522 and Tenant Routing Checker 524. Similarly, Routing Parser 526 can receive Ci_Model 474 and Hi_Model 476 and parse each model for information for downstream operators, Endpoint Checker 522 and Tenant Routing Checker 524.

After Ci_Model 474, Hi_Model 476, L_Model 470A and/or LR_Model 470B are parsed, Routing Policy Parser 520 and/or Routing Parser 526 can send cleaned-up protocol buffers (Proto Buffs) to the downstream operators, Endpoint Checker 522 and Tenant Routing Checker 524. Endpoint Checker 522 can then generate events related to Endpoint violations, such as duplicate IPs, APIPA, etc., and Tenant Routing Checker 524 can generate events related to the deployment of BDs, VRFs, subnets, routing table prefixes, etc.

Figure 5C:
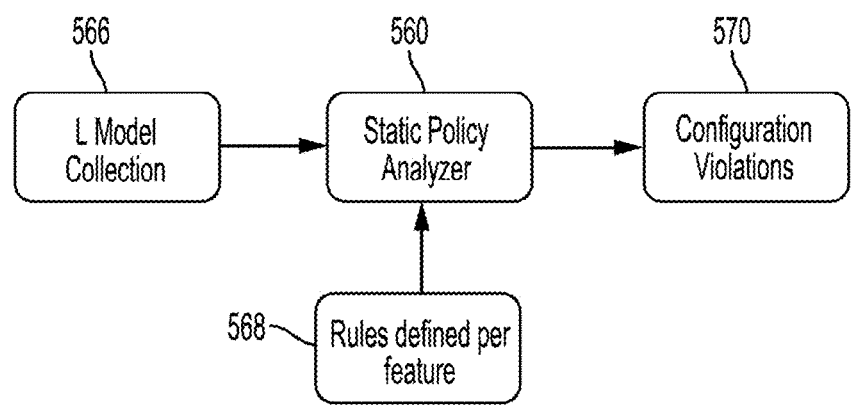
FIG. 5C illustrates a schematic diagram of an example system for static policy analysis in a network, in accordance with various aspects of the subject technology.

FIG. 5C illustrates a schematic diagram of an example system for static policy analysis in a network (e.g., data center network 300), in accordance with various aspects of the subject technology. Static Policy Analyzer 560 can perform assurance checks to detect configuration violations, logical lint events, contradictory or conflicting policies, unused contracts, incomplete configurations, etc. Static Policy Analyzer 560 can check the specification of the user's intent or intents in L_Model 470A to determine if any configurations in Controllers 316 are inconsistent with the specification of the user's intent or intents.

Static Policy Analyzer 560 can include one or more of the Operators 510 executed or hosted in Assurance Appliance 500. However, in other configurations, Static Policy Analyzer 560 can run one or more operators or engines that are separate from Operators 510 and/or Assurance Appliance 500. For example, Static Policy Analyzer 560 can be a VM, a cluster of VMs, or a collection of endpoints in a service function chain.

Static Policy Analyzer 560 can receive as input L_Model 470A from Logical Model Collection Process 566 and Rules 568 defined for each feature (e.g., object) in L_Model 470A. Rules 568 can be based on objects, relationships, definitions, configurations, and any other features in MIM 400. Rules 568 can specify conditions, relationships, parameters, and/or any other information for identifying configuration violations or issues.

Moreover, Rules 568 can include information for identifying syntactic violations or issues. For example, Rules 568 can include one or more rules for performing syntactic checks. Syntactic checks can verify that the configuration of L_Model 470A is complete, and can help identify configurations or rules that are not being used. Syntactic checks can also verify that the configurations in the hierarchical MIM 400 are complete (have been defined) and identify any configurations that are defined but not used. To illustrate, Rules 568 can specify that every tenant in L_Model 470A should have a context configured; every contract in L_Model 470A should specify a provider EPG and a consumer EPG; every contract in L_Model 470A should specify a subject, filter, and/or port; etc.

Rules 568 can also include rules for performing semantic checks and identifying semantic violations or issues. Semantic checks can check conflicting rules or configurations. For example, Rule1 and Rule2 can have aliasing issues, Rule1 can be more specific than Rule2 and thereby create conflicts/issues, etc. Rules 568 can define conditions which may result in aliased rules, conflicting rules, etc. To illustrate, Rules 568 can specify that an allow policy for a specific communication between two objects can conflict with a deny policy for the same communication between two objects if the allow policy has a higher priority than the deny policy, or a rule for an object renders another rule unnecessary.

Static Policy Analyzer 560 can apply Rules 568 to L_Model 470A to check configurations in L_Model 470A and output Configuration Violation Events 570 (e.g., alerts, logs, notifications, etc.) based on any issues detected. Configuration Violation Events 570 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Static Policy Analyzer 560 can iteratively traverse each node in a tree generated based on L_Model 470A and/or MIM 400, and apply Rules 568 at each node in the tree to determine if any nodes yield a violation (e.g., incomplete configuration, improper configuration, unused configuration, etc.). Static Policy Analyzer 560 can output Configuration Violation Events 570 when it detects any violations.

The disclosure now turns to FIGS. 6A and 6B, which illustrate example methods. FIG. 6A illustrates example method for network assurance, and FIG. 6B illustrates an example method for generating logical models. The methods are provided by way of example, as there are a variety of ways to carry out the methods. Additionally, while the example methods are illustrated with a particular order of blocks or steps, those of ordinary skill in the art will appreciate that FIGS. 6A and 6B, and the blocks shown therein, can be executed in any order and can include fewer or more blocks than illustrated.

Each block shown in FIGS. 6A and 6B represents one or more steps, processes, methods or routines in the methods. For the sake of clarity and explanation purposes, the blocks in FIGS. 6A and 6B are described with reference to Assurance Appliance 500, Models 470A-B, 472, 474, 476, and data center network 300, as shown in FIGS. 1A-B, 2D, and 3A.

FIG. 6A illustrates a flowchart for an example network assurance method, in accordance with various aspects of the subject technology. At step 600, Assurance Appliance 500 can collect data and obtain models associated with data center network 300. The models can include Models 470A-B, 472, 474, 476. The data can include fabric data (e.g., topology, switch, interface policies, application policies, EPGs, etc.), network configurations (e.g., BDs, VRFs, L2 Outs, L3 Outs, protocol configurations, etc.), security configurations (e.g., contracts, filters, etc.), service chaining configurations, routing configurations, and so forth. Other information collected or obtained can include, for example, network data (e.g., RIB/FIB, VLAN, MAC, ISIS, DB, BGP, OSPF, ARP, VPC, LLDP, MTU, QoS, etc.), rules and tables (e.g., TCAM rules, ECMP tables, etc.), endpoint dynamics (e.g., EPM, COOP EP DB, etc.), statistics (e.g., TCAM rule hits, interface counters, bandwidth, etc.).

At step 602, Assurance Appliance 500 can analyze and model the received data and models. For example, Assurance Appliance 500 can perform formal modeling and analysis, which can involve determining equivalency between models, including configurations, policies, etc.

At step 604, Assurance Appliance 500 can generate one or more smart events. Assurance Appliance 500 can generate smart events using deep object hierarchy for detailed analysis, such as Tenants, switches, VRFs, rules, filters, routes, prefixes, ports, contracts, subjects, etc.

At step 606, Assurance Appliance 500 can visualize the smart events, analysis and/or models. Assurance Appliance 500 can display problems and alerts for analysis and debugging, in a user-friendly GUI.

FIG. 6B illustrates an example method for generating a device specific logical model, in accordance with various aspects of the subject technology. At step 620, Assurance Appliance 500 can obtain, from Controllers 316, logical level configuration data associated with Data center network 300. The logical level configuration data can include configurations or other models stored at Controllers 316 for Data center network 300. The logical level configuration data may be based, at least in part, on configuration information provided by a network administrator. Based on the logical level configuration data, at step 622, Assurance Appliance 500 can generate a network-wide logical model (e.g., L_Model 470A) of Data center network 300. The network-wide logical model can represent a configuration of objects in a hierarchical management information tree (e.g., MIM 400) associated with the network.

At step 624, Assurance Appliance 500 can generate, based on the network-wide logical model, a rendered logical model (e.g., LR_Model 470B) of the network. The rendered logical model can include a runtime state of the network. The rendered logical model can be formatted in a manner that can be read, executed, rendered, and/or interpreted by network devices in Fabric 320, such as Leafs 304 and Spines 302. In some cases, the rendered logical model can be a flat model of the network-wide logical model containing objects or identifiers that are understood by network devices in Fabric 320, such as JSON objects, hardware plane identifiers, policy group tags, etc.

Based on the rendered logical model, at step 626, Assurance Appliance can generate, for one or more network devices in data center network 300 (e.g., Leafs 304 in Fabric 320), a respective device-specific representation of the network-wide logical model (e.g., Li_Model 472). The respective device-specific representation can project the network-wide logical model onto a respective network device. In other words, the respective device-specific representation can convey how the network-wide logical model should look or apply at the respective network device. For example, the respective device-specific representation can be a switch-specific logical model that represents the network-wide logical model as perceived, projected, applicable, etc., to the particular switch.

As noted above, a network assurance appliance that is external to the data center network may need to communicate with components in the data center network in order to collect network information and/or models used to provide assurance services. However, one or more NAT servers may also sit between the components of data center network and the network assurance appliance and provide NAT services that may hinder the ability of the network assurance appliance to communicate with the components.

Figure 7:
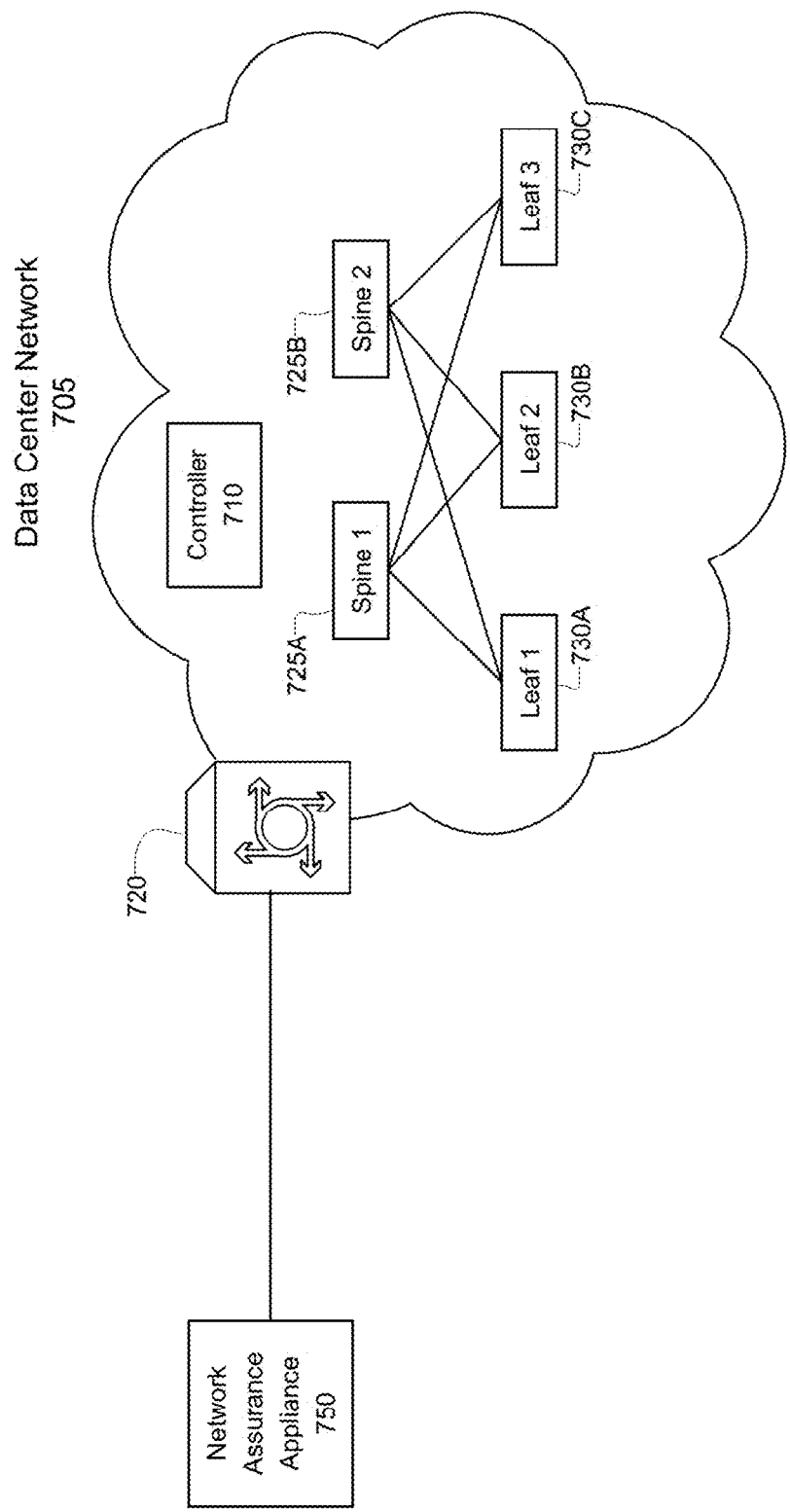
FIG. 7 is a conceptual block diagram illustrating an example network environment that includes a data center network, in accordance with various embodiments of the subject technology.

FIG. 7 is a conceptual block diagram illustrating an example network environment 700 that includes a data center network 705, in accordance with various embodiments of the subject technology. The data center network 705 shown in FIG. 7 is a simplified view of a data center network. The data center network may include various components that include, but are not limited to, a controller 710 (e.g., an APIC controller or other type of network controller), one or more spine nodes 725A-B and one or more leaf nodes 730A-C.

A network assurance appliance 750 may be remotely located provide network assurance services to the data center network 705. A NAT server 720 may provide NAT services for the data center network 705 and may be included in the data center network 705. In other implementation, the NAT server 720 may be elsewhere along the communication path between the network assurance appliance 750 and the data center network. As a result, the network assurance appliance 750 may communicate with components of the data center network 705 via the NAT server 720 using public IP addresses for those components. However, the network assurance appliance 750 may only be aware of the public IP addresses of a subset of the components in the data center network 705 and may not be aware of others. Aspects of the subject technology address this technical problem by providing a means for the network assurance appliance 750 external to the data center network 705 to discover unknown public IP addresses of resources or components in the data center network 705.

For example, the public IP address of the controller 710 may be known to the network assurance appliance 750, but the network assurance appliance 750 may not know the public IP addresses of the leaf nodes 730A-C and spine nodes 725A-B or even be aware of their existence. The network assurance appliance 750 will be unable to communicate with the leaf nodes 730A-C and spine nodes 725A-B without their public IP addresses. The network assurance appliance 750 is configured to request and receive network assurance information from the controller 710 using the public IP address for the controller 710. The network assurance information may include network information discussed above and data models (e.g., L_Model 470A and/or LR_Model 470B of FIG. 4D) used to perform network assurance functions. However, the network assurance information may also include a listing of a set of additional components in the data center network 705 and their respective IP addresses. In the example illustrated in FIG. 7, the set of components include the leaf nodes 730A-C and spine nodes 725A-B in data center network 705. The IP addresses from the controller 710 may be private IP addresses that the controller 710 uses to communicate with the set of components within the network.

Based on the network assurance information received from the controller 710, the network assurance appliance 750 may be able to the additional set of components in the data center network 705 and their private IP addresses used within the data center network 705. However, these private IP addresses cannot be used to directly communicate with the components from outside of the data center network 705 through the NAT server 720. Accordingly, the network assurance appliance 750 may translate the private IP addresses for the set of components (e.g., the leaf nodes 730A-C and spine nodes 725A-B in data center network 705) into public IP addresses using a mapping of a private IP address space to a public IP address space for these components. The mapping information may come in the form of a NAT configuration file that is requested and retrieved from the NAT server 720 or provided by a network administrator via another means (e.g., file upload).

Once the public IP addresses for the components are determined by the network assurance appliance 750, the network assurance appliance 750 may transmit requests for network assurance information to one or more (or all) of the set of components (e.g., the leaf nodes 730A-C and spine nodes 725A-B in data center network 705). The network assurance information from the components (e.g., the leaf nodes 730A-C and spine nodes 725A-B in data center network 705) may be the same, have different scope than the network assurance information from the controller 710, or a combination. For example, the network assurance information from the leaf nodes 730A-C and spine nodes 725A-B may include switch software configurations (e.g., Ci_Model 474 of FIG. 4D), hardware configurations (e.g., Hi_Model 476 of FIG. 4D), or other information that may be used to provide network assurance services.

Figure 8:
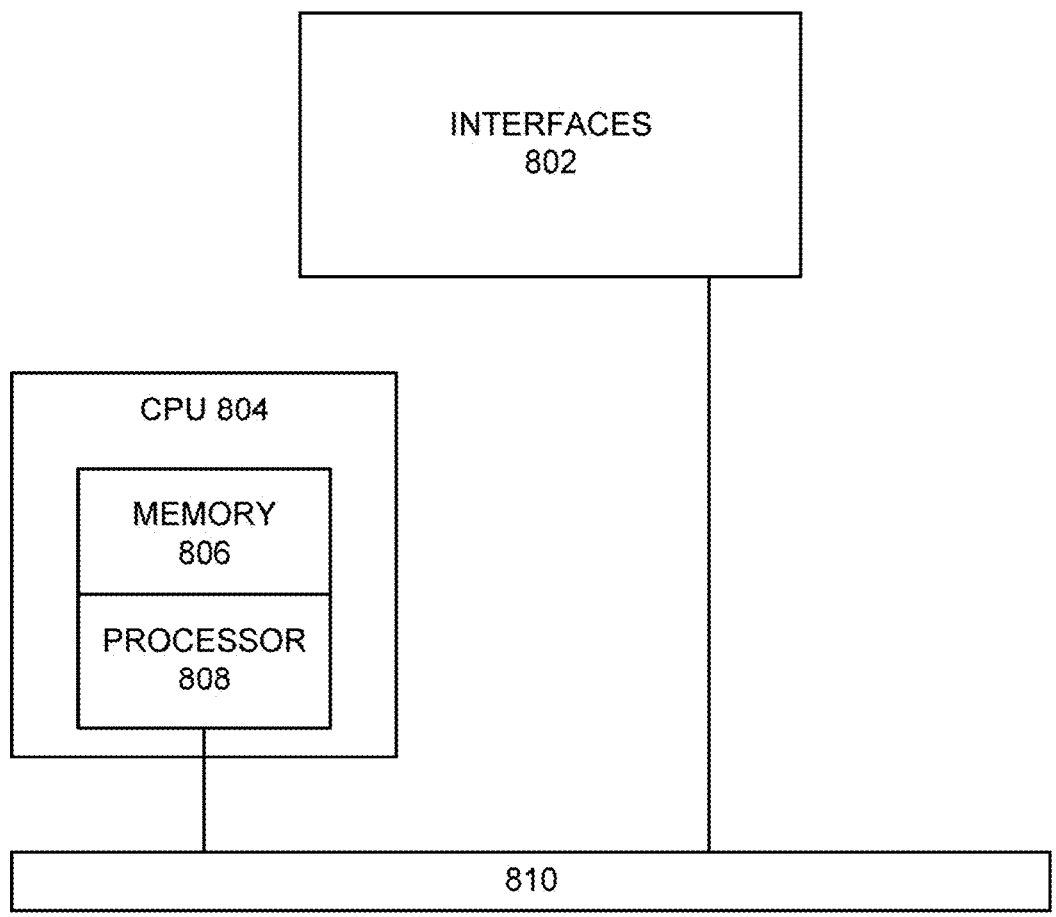
FIG. 8 illustrates an example network device in accordance with various embodiments.
Figure 9:
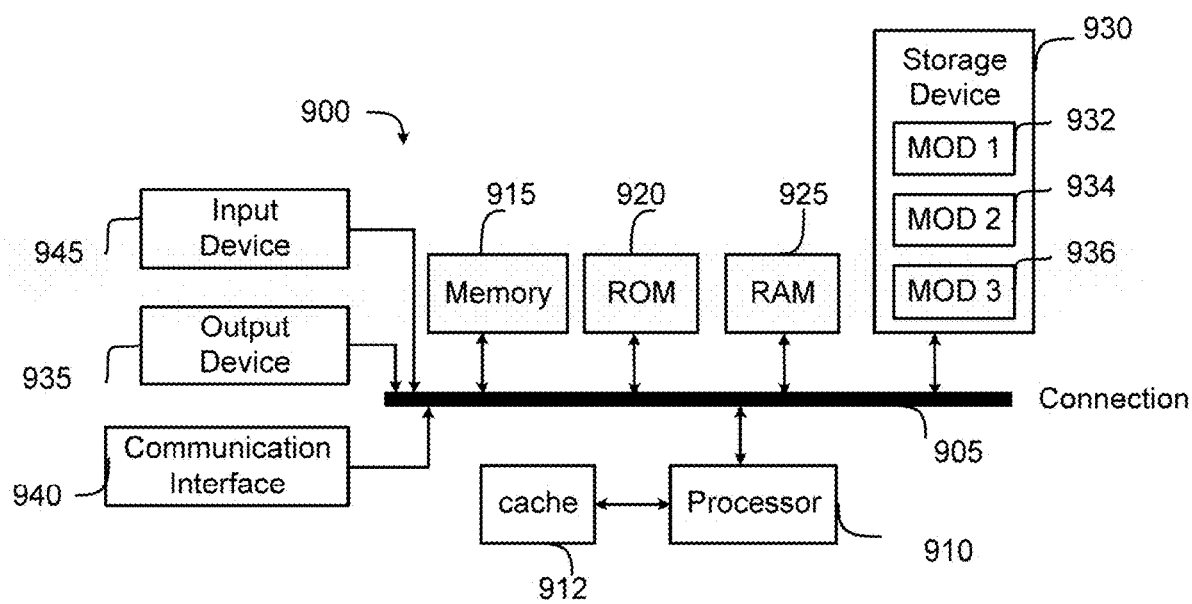
FIG. 9 illustrates an example computing device in accordance with various embodiments.

The disclosure now turns to FIGS. 8 and 9, which illustrate example network devices and computing devices, such as switches, routers, load balancers, client devices, and so forth.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

FIG. 9 illustrates a computing system architecture 900 wherein the components of the system are in electrical communication with each other using a connection 905, such as a bus. Exemplary system 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
receiving, at a network device external to a network, a public Internet Protocol (IP) address of a network component of the network and network address translation (NAT) data that maps first private IP addresses for first network devices in the network to public IP addresses for the first network devices in the network;
obtaining, from the network component, at the network device external to the network and in response to a communication from the network device that is directed to the network component using the public IP address of the network component second private IP addresses for second network devices in the network, wherein the first network devices in the network are different than the second network devices in the network;
translating, by the network device external to the network and using the NAT data that maps the first private IP addresses for the first network devices to the public IP addresses for the first network devices, at least one private IP address for at least one network device of the second network devices in the network to at least one public IP address for the at least one network device of the second network devices, and
providing, via the network device external to the network, a network management service associated with network assurance services for the network using the at least one public IP address to allow the network device external to the network to communicate with the network component, for the at least one network device of the second network devices and second network information from the at least one network device.

2. The method of claim 1, further comprising obtaining network assurance information from the network component using the public IP address of the network component, wherein the network assurance information comprises the second private IP addresses and at least one of configuration information of the network, a list of network devices on the network, and one or more data models of the network.

3. The method of claim 1, wherein the network component comprises a network controller in the network.

4. The method of claim 3, wherein the network controller comprises a centralized controller, and wherein the network comprises a software-defined network.

5. The method of claim 1, further comprising transmitting, from the network component and using the at least one public IP address, a request to a network address translation (NAT) device for network assurance information from the at least one network device, wherein the network management service is provided based on the network assurance information.

6. The method of claim 1, further comprising receiving, by the network device and from a NAT device associated with the network, network assurance information comprising at least one of switch software configurations, switch hardware configurations, a network model, and network configurations.

7. The method of claim 6, further comprising providing network assurance services for the network based on the network assurance information.

8. The method of claim 1, further comprising querying a NAT device for the NAT data.

9. The method of claim 1, wherein the first network devices comprise at least one of switches, routers, servers, and endpoints.

10. A system that is external to a network, the system comprising:
one or more processors; and
at least one non-transitory computer-readable storage medium storing instructions which, when executed by the one or more processors, cause the one or more processors to:
receive a public Internet Protocol (IP) address of a network component of the network and network address translation (NAT) data that maps first private IP addresses for first network devices in the network to public IP addresses for the first network devices in the network;
obtain, from the network addresses for the first network devices in the network;
obtain, from the network component and in response to a communication from the network device that is directed to the network component using the public IP address of the network component, second private IP addresses for second network devices in the network, wherein the first network devices in the network are different than the second network devices in the network;
translate, using the NAT data that maps the first private IP addresses for the first network devices to the public IP addresses for the first network devices, at least one private IP address for at least one network device of the second network devices in the network to at least one public IP address for the at least one network device of the second network devices; and
provide a network management service associated with network assurance services for the network using the at least one public IP address to allow the network device external to the network to communicate with the network component, for the at least one network device of the second network devices and second network information from the at least one network device.

11. The system of claim 10, wherein the instructions further cause the one or more processors to obtain network assurance information from the network component using the public IP address of the network component, wherein the network assurance information comprises the second private IP addresses and at least one of configuration information of the network, a list of network devices on the network, and one or more data models of the network.

12. The system of claim 10, wherein the network component comprises a network controller in the network.

13. The system of claim 12, wherein the network controller comprises a centralized controller, and wherein the network comprises a software-defined network.

14. The system of claim 10, wherein the instructions further cause the one or more processors to transmit, from the network component and using the at least one public IP address, a request to a network address translation (NAT) device for network assurance information from the at least one network device, wherein the network management service is provided based on the network assurance information.

15. The system of claim 10, wherein the instructions further cause the one or more processors to receive, by the network device and from a NAT device associated with the network, network assurance information comprising at least one of switch software configurations, switch hardware configurations, a network model, and network configurations.

16. The system of claim 15, wherein the instructions further cause the one or more processors to provide network assurance services for the network based on the network assurance information.

17. The system of claim 10, wherein the first network devices comprise at least one of switches, routers, servers, and endpoints.

18. A non-transitory computer-readable medium comprising instructions that, when executed by one or more processors of a network device external to a network, cause the one or more processors to:
receive a public Internet Protocol (IP) address of a network component of the network and network address translation (NAT) data that maps first private IP addresses for first network devices in the network to public IP addresses for the first network devices in the network;
obtain, from the network component and in response to a communication from the network device that is directed to the network component using the public IP address of the network component, second private IP addresses for second network devices in the network, wherein the first network devices in the network are different than the second network devices in the network;
translate, using the NAT data that maps the first private IP addresses for the first network devices to the public IP addresses for the first network devices, at least one private IP address for at least one network device of the second network devices in the network to at least one public IP address for the at least one network device of the second network devices; and provide a network management service associated with network assurance services for the network using the at least one public IP address to allow the network device external to the network to communicate with the network component, for the at least one network device of the second network devices and second network information from the at least one network device.

19. The non-transitory computer-readable medium of claim 18, wherein the instructions further cause the one or more processors to obtain network assurance information from the network component using the public IP address of the network component, wherein the network assurance information comprises the second private IP addresses and at least one of configuration information of the network, a list of network devices on the network, and one or more data models of the network.

20. The non-transitory computer-readable medium of claim 18, wherein the instructions further cause the one or more processors to receive, by the network device and from a NAT device associated with the network, network assurance information comprising at least one of switch software configurations, switch hardware configurations, a network model, and network configurations.

* * * * *